(12) United States Patent
Ravi et al.

(10) Patent No.: US 11,526,680 B2
(45) Date of Patent: Dec. 13, 2022

(54) PRE-TRAINED PROJECTION NETWORKS FOR TRANSFERABLE NATURAL LANGUAGE REPRESENTATIONS

(71) Applicant: Google LLC, Mountain View, CA (US)

(72) Inventors: Sujith Ravi, Santa Clara, CA (US); Zornitsa Kozareva, Santa Clara, CA (US); Chinnadhurai Sankar, Montreal (CA)

(73) Assignee: GOOGLE LLC, Mountain View, CA (US)

( * ) Notice: Subject to any disclaimer, the term of this patent is extended or adjusted under 35 U.S.C. 154(b) by 334 days.

(21) Appl. No.: 16/790,917

(22) Filed: Feb. 14, 2020

(65) Prior Publication Data

US 2020/0265196 A1 Aug. 20, 2020

Related U.S. Application Data

(60) Provisional application No. 62/805,498, filed on Feb. 14, 2019.

(51) Int. Cl.
| | | |
|---|---|---|
| *G06F 40/56* | (2020.01) | |
| *G06N 20/00* | (2019.01) | |
| *H04L 67/04* | (2022.01) | |
| *G06K 9/62* | (2022.01) | |
| *G06N 3/04* | (2006.01) | |

(52) U.S. Cl.
CPC .......... *G06F 40/56* (2020.01); *G06K 9/6256* (2013.01); *G06N 3/0472* (2013.01); *G06N 20/00* (2019.01); *H04L 67/04* (2013.01)

(58) Field of Classification Search
CPC .... G06F 40/216; G06F 40/268; G06F 40/284; G06F 40/289; G06F 40/295; G06F 40/30; G06F 40/44; G06F 40/56; G06K 9/6232; G06K 9/6256; G06N 20/00; G06N 3/0445;

(Continued)

(56) References Cited

U.S. PATENT DOCUMENTS 5,276,771 A * 1/1994 Manukian ............ G06N 3/0454
706/31
9,842,106 B2 12/2017 Hori et al.

(Continued)

FOREIGN PATENT DOCUMENTS

| CN | 104538028 | 4/2015 |
|---|---|---|
| EP | 3144859 | 3/2017 |
| WO | WO 1993/13487 | 7/1993 |

OTHER PUBLICATIONS

Abadi et al., "TensorFlow: Large-Scale Machine Learning on Heterogeneous Distributed Systems", arXiv:1603.04467v2, Mar. 16, 2016, 19 pages.

(Continued)

*Primary Examiner* — Quynh H Nguyen
(74) *Attorney, Agent, or Firm* — Dority & Manning, P.A.

(57) ABSTRACT

Systems and methods are provided to pre-train projection networks for use as transferable natural language representation generators. In particular, example pre-training schemes described herein enable learning of transferable deep neural projection representations over randomized locality sensitive hashing (LSH) projections, thereby surmounting the need to store any embedding matrices because the projections can be dynamically computed at inference time.

20 Claims, 11 Drawing Sheets

(58) Field of Classification Search
CPC .... G06N 3/0454; G06N 3/0472; G06N 3/082; G06N 3/084; G06V 10/82; H04L 67/04
USPC .......................................................... 709/9
See application file for complete search history.

(56) References Cited

U.S. PATENT DOCUMENTS

| | | | |
|---|---|---|---|
| 9,990,687 | B1 | 6/2018 | Kaufhold et al. |
| 10,748,066 | B2* | 8/2020 | Ravi ........................ G06N 3/08 |
| 10,811,000 | B2* | 10/2020 | Le Roux ................. G10L 17/00 |
| 10,812,449 | B1* | 10/2020 | Cholleton ................ G06N 3/02 |
| 10,885,082 | B2* | 1/2021 | Stoyanovsky ....... G06N 3/0445 |
| 10,885,277 | B2* | 1/2021 | Ravi ...................... G06N 3/084 |
| 10,984,565 | B2* | 4/2021 | Xing ..................... G06T 11/006 |
| 11,017,778 | B1* | 5/2021 | Thomson .......... H04M 3/42382 |
| 11,068,722 | B2* | 7/2021 | Cheri .................. G06K 9/6234 |
| 11,106,868 | B2* | 8/2021 | Yadav ..................... G10L 15/30 |
| 2014/0067735 | A1 | 3/2014 | Yu |
| 2014/0156575 | A1 | 6/2014 | Sainath et al. |
| 2015/0074027 | A1 | 3/2015 | Huang et al. |
| 2016/0078339 | A1 | 3/2016 | Li et al. |
| 2016/0307564 | A1 | 10/2016 | Sethy et al. |
| 2016/0307566 | A1 | 10/2016 | Bellegarda |
| 2017/0132528 | A1 | 5/2017 | Aslan et al. |
| 2017/0139913 | A1 | 5/2017 | Hsiao |
| 2018/0121799 | A1* | 5/2018 | Hashimoto ............ G06N 3/084 |
| 2018/0150744 | A1 | 5/2018 | Orr et al. |
| 2018/0260381 | A1* | 9/2018 | Carreras ............... G06F 40/289 |
| 2018/0336472 | A1* | 11/2018 | Ravi ..................... G06N 3/0454 |
| 2018/0341702 | A1* | 11/2018 | Sawruk ..................... G06N 3/08 |
| 2018/0356771 | A1 | 12/2018 | Basu et al. |
| 2019/0147371 | A1* | 5/2019 | Deo ....................... G06N 20/20 706/12 |
| 2019/0206095 | A1* | 7/2019 | Xing ...................... G06N 3/084 |
| 2019/0294695 | A1* | 9/2019 | Stoyanovsky ........... G06F 16/36 |
| 2019/0318725 | A1* | 10/2019 | Le Roux ............... G10L 15/063 |
| 2019/0370273 | A1* | 12/2019 | Frison ................. G06F 16/3347 |
| 2019/0392302 | A1* | 12/2019 | Mandt ................. G06N 3/0472 |
| 2019/0393903 | A1* | 12/2019 | Mandt .............. H03M 13/6502 |
| 2020/0042596 | A1* | 2/2020 | Ravi ...................... G06N 3/063 |
| 2020/0104102 | A1* | 4/2020 | Brockschmidt ........... G06F 8/65 |
| 2020/0265196 | A1* | 8/2020 | Ravi ....................... G06F 40/44 |
| 2020/0349450 | A1* | 11/2020 | Ravi ........................ G06N 3/10 |
| 2021/0124878 | A1* | 4/2021 | Ravi ....................... G06F 40/30 |
| 2021/0185066 | A1* | 6/2021 | Shah .................... G06N 3/0445 |

OTHER PUBLICATIONS

Adam et al., "The ICSI Meeting Corpus", 2003 IEEE International Conference on Acoustics, Speech, and Signal Processing, April 6-10, 2003, Hong Kong, China, 4 pages.

Agirre et al., "A Study on Similarity and Relatedness Using Distributional and WordNet-based Approaches", 2009 Annual Conference of the North American Chapter of the Association for Computational Linguistics (HLT—NAACL—2009). May 31-Jun. 5, 2009, Boulder, Colorado, 9 pages.

Ahmed et al., "FastEx: Hash Clustering with Exponential Families", Advances in Neural Information Processing Systems (NIPS 2012), Dec. 3-6, 2012, Lake Tahoe, NV, 9 pages.

Bahdanau et al., "Neural Machine Translation by Jointly Learning to Align and Translate", arXiv:1409.0473v7, May 19, 2016, 15 pages.

Bui et al., "Neural Graph Learning: Training Neural Networks Using Graphs", Eleventh AMC International Conference on Web Search and Data Mining, Feb. 5-9, 2018, Los Angeles, CA, 8 pages.

Bui et al., "Neural Graph Machines: Learning Neural Networks using Graphs". arXiv:1703.04818v1. Mar. 14, 2017, 9 pages.

Byrne, "Encoding Reality: Prediction-Assisted Cortical Learning Algorithm in Hierarchical Temporal Memory", arXiv:1509.08255v2, Oct. 8, 2015, 28 pages.

Charikar et al., "Similarity Estimation Techniques from Rounding Algorithms", 34th ACM Symposium on Theory of Computing, May 19-21, 2002, Montreal, Quebec, Canada, 9 pages.

Chen et al., "Compressing Neural Networks with the Hashing Trick", arXiv:1504.04788v1, Apr. 19, 2015, 10 pages.

Cheng et al., "Neural Summarization by Extracting Sentences and Words", 54th Annual Meeting of the Association for Computational Linguistics (vol. 1: Long Papers). Aug. 7-12, 2016, Berlin, Germany, pp. 484-494.

Cheng et al., "Solving Convex Optimization Problems using Recurrent Neural Networks in Finite Time", 2009 International Joint Conference on Neural Networks, Jun. 14-19, 2009, Atlanta, Georgia, pp. 538-543.

Chun et al., "Augmented Smartphone Applications through Clone Cloud Execution", Intel Research Berkeley, 5 pages.

Communication received in European Application No. 18729286.7, dated Feb. 4, 2020, 13 pages.

Courbariaux et al., "Binarized Neural Networks: Training Neural Networks with Weights and Activations Constrained to +1 or -1", arXiv:1602.02830v3, Mar. 17, 2016, 11 pages.

Courbariaux et al., "Low Precision Arithmetic for Deep Learning", arXiv:1412.70242v2, Dec. 25, 2014, 9 pages.

Dahl et al., "Large-Scale Malware Classification using Random Projections and Neural Networks", 38th International Conference on Acoustics, Speech and Signal Processing (ICASSP), May 26-31, 2013, Vancouver Canada, 5 pages.

Denil et al., "Predicting Parameters in Deep Learning", arXiv:1306.0543v2, Oct. 27, 2014, 9 pages.

Finkelstein et al., "Placing Search in Context: The Concept Revisited", Tenth International World Wide Web Conference, WWW10, May 1-5, 2001, Hong Kong, China, pp. 406-414.

Ganchev et al., "Small Statistical Models by Random Feature Mixing", 46th Annual Meeting of the Association for Computational Linguistics, Jun. 15-20, 2008, Columbus, Ohio, pp. 19-20.

Gao et al., "Black-box Generation of Adversarial Text Sequences to Evade Deep Learning Classifiers", 2018 IEEE Symposium on Security and Privacy Workshops, May 24, 2018, San Francisco, CA, pp. 50-56.

Godfrey et al., "Switchboard: Telephone Speech Corpus for Research and Development", 1992 IEEE International Conference on Acoustics, Speech and Signal Processing, Mar. 23-26, 1992, San Francisco, CA, pp. 517-520.

Gong et al., "Compressing Deep Convolutional Networks using Vector Quantization", arXiv:1412.6115v1, Dec. 18, 2014, 10 pages.

Goodfellow et al., "Generative Adversarial Nets", arXiv:1406.2661v1, Jun. 10, 2014, 9 pages.

He et al., "Streaming Small-Footprint Keyword Spotting Using Sequence-To-Sequence Models", arXiv:1710.09617v1, Oct. 26, 2017, 8 pages.

Hinton et al., "Deep Neural Networks for Acoustic Modeling in Speech Recognition: The Shared Views of Four Research Groups", Signal Processing Magazine, vol. 2, Nov. 2012, 16 pages.

Hinton et al., "Distilling the Knowledge in a Neural Network", arXiv:1503.02531v1, Mar. 9, 2015, 9 pages.

Iandola et al., "Squeezenet: Alexnet-Level Accuracy with 50x Fewer Parameters and <0.5MB Model Size", arXiv:1602.07360v4, Nov. 4, 2016, 13 pages.

International Preliminary Report on Patentability for PCT/US2018/033378, dated Nov. 26, 2019, 13 pages.

International Search Report and Written Opinion for PCT/US2018/033378, dated Jul. 24, 2018, 20 pages.

Ji et al., "Backoff Model Training Using Partially Observed Data: Application to Dialog Act Tagging", Human Language Technology Conference of the North American Chapter of the Association of Computational Linguistics, Jun. 4-9, 2006. Brooklyn, New York, 8 pages.

Jurafsky et al., "Automatic Detection of Discourse Structure for Speech Recognition and Understanding", IEEE Automatic Speech Recognition and Understanding Workshop, Dec. 14-18, 2019, Sentosa, Singapore, 8 pages.

(56) References Cited

OTHER PUBLICATIONS

Kaban, "Improved Bounds on the Dot Product Under Random Projection and Random Sign Projection", Conference on Knowledge Discovery and Data Mining, Aug. 11-14, 2015. Sydney, Australia, 10 pages.
Kannan et al., "Smart Reply: Automated Response Suggestion for Emails", arXiv:1606.04870v1, Jun. 15, 2016, 10 pages.
Khanpour et al., "Dialogue Act Classification in Domain-Independent Conversations Using a Deep Recurrent Neural Networks", Conference on Computational Linguistics, Dec. 11-17, 2016. Osaka, Japan, 10 pages.
Kingma et al., "Adam: A Method For Stochastic Optimization", arXiv:1412.6980v1 Dec. 22, 2014, 9 pages.
Konecny et al., "Federated Optimization: Distributed Machine Learning for On-Device Intelligence", arXiv:16010.02527v1, Oct. 8, 2016, 38 pages.
Krizhevsky et al., "ImageNet Classification with Deep Convolutional Neural Networks". Twenty Sixth Annual Conference on Neural Information Processing Systems (NIPS), Dec. 3-8, 2012, Lake Tahoe, NV, 9 pages.
Krizhevsky, Alex Krizhevsky, "The CIFAR-10 Dataset", https://www.cs.toronto.edu/~kriz/cifar.html, retrieved on Jun. 24, 2020, 4 pages.
Lecun et al., Yann.lecun.com, "The MNIST Database", http://yann.lecun.com/exdb/mnist/, retrieved on Jun. 24, 2020, 7 pages.
Lee et al., "A Low-Power Processor with Configurable Embedded Machine-Learning Accelerators for High-Order and Adaptive Analysis of Medical-Sensor Signals", Journal of Solid-State Circuits, vol. 48, No. 7, Jul. 2013, pp. 1625-1637.
Lee et al., "Sequential Short-Text Classification with Recurrent and Convolutional Neural Networks", Conference of the North American Chapter of the Association for Computational Linguistics: Human Language Technologies, Jun. 12-17, 2016. San Diego, California, pp. 515-520.
Lin et al., "Building a Reusable Test Collection for Question Answering", Journal of the American Society for Informational Science and Technology, vol. 57, No. 7, 2006, pp. 851-861.
Liu et al., "IJCNLP-2017 Task 4: Customer Feedback Analysis", Joint Conference on Natural Language Processing, Nov. 27-Dec. 1, 2017, Taipei, Taiwan, 8 pages.
Liu et al., "Stochastic Answer Networks for Machine Reading Comprehension", 56th Annual Meeting of the Association for Computational Linguistics (vol. 1: Long Papers), Jul. 15-20, 2018, Melbourne, Australia, pp. 1694-1704.
Loshchilov et al., "SGDR: Stochastic Gradient Descent with Warm Restarts", 5th International Conference on Learning Representations, Apr. 24-26, 20174, Toulon, France, 16 pages.
Lu et al., "Hierarchical Recurrent Neural Hashing for Image Retrieval with Hierarchical Convolutional Features", Transactions on Image Processing, vol. 27, No. 1, Jan. 2018, pp. 106-120.
Luong et al., "Better Word Representations with Recursive Neural Networks for Morphology", Seventeenth Conference on Computational Natural Language Learning, CoNLL 2013, Aug. 8-9, 2013, Sofia, Bulgaria, 10 pages.
Manning et al., "An Introduction to Information Retrieval", Online Edition 2009 Cambridge University Press, Cambridge, England, Apr. 1, 2009, 569 pages.
Mikolov et al., "Distributed Representations of Words and Phrases and their Compositionality", Twenty-Seventh Conference on Neural Information Processing Systems, Dec. 5-10, 2013, Lake Tahoe, NV, 9 pages.
Mikolov et al., "Efficient Estimation of Word Representations in Vector Space", arXiv:1301.3781v3, Sep. 7, 2013, 12 pages.
Nair et al., "Rectified Linear Units Improve Restricted Boltzmann Machines", 27th International Conference on Machine Learning (ICML 2010), Jun. 21-24, 2010, Haifa, Israel, 8 pages.
Neumann, "Regularization by Intrinsic Plasticity and Its Synergies with Recurrent for Random Projection Methods", Journal of Intelligent Learning Systems and Applications, vol. 4, No. 3, 2012. pp. 230-246.

Ortega et al., "Neural-based Context Representation Learning for Dialog Act Classification", 18th Annual SIGdial Meeting on Discourse and Dialogue, Jul. 12-14, 2018, Melbourne, Australia, pp. 247-252.
Pang et al., "Revisiting the Predictability of Language: Response Completion in Social Media". Joint Conference on Empirical Methods in Natural Language Processing and Computational Natural Language Learning, Jul. 12-14, 2012. Jeju Island, Korea, pp. 1489-1499.
Pennington et al.,. "GloVe: Global Vectors for Word Representation", 2014 Conference on Empirical Methods in Natural Language Processing (EMNLP), Oct. 25-29, 2014, Delia, Qatar, pp. 1532-1543.
Peters et al., "Deep contextualized word representations". 2018 Conference of the North American Chapter of the Association for Computational Linguistics: Human Language Technologies. Jun. 1-6, 2018, New Orleans, LA, pp. 2227-2237.
Plank, "All-in-1 at IJCNLP-2017 Task 4: Short Text Classification with One Model for All Languages", Joint Conference on Natural Language Processing, Shared Tasks, Nov. 27-Dec. 1, 2017, Taipei, Taiwan, pp. 143-148.
Quora, "What Does Dr. Hinton Mean by Hard vs. Soft Targets", http://quora.com/what-does-Dr-Hinton-mean-by-hard-vs-soft-targets, retrieved on Jun. 24, 2020, 2 pages.
QUORA. "What is Signum Function, What is its Uses in Machine Learning Neural Networks", http://www.quora.com/What-is-signum-function-what-is-its-uses-in-machine-learning-neural-networks, retrieved on Jun. 24, 2020, 3 pages.
Radinsky et al., "A Word at a Time: Computing Word Relatedness using Temporal Semantic Analysis", 20th International Conference on World Wide Web, WWW 2011, Mar. 28-Apr. 1, 2011, Hyderabad, India, pp. 337-346.
Ravi et al., "Large Scale Distributed Semi-Supervised Learning using Streaming Approximation", arXiv:1512.01752v1, Dec. 6, 2015, 10 pages.
Ravi et al., "Self-Governing Neural Networks for On-Device Short Text Classification", 2018 Conference on Empirical Methods in Natural Language Processing, Oct. 31-Nov. 4, 2018, Brussels, Belgium, pp. 887-893.
Ravi, "ProjectionNet: Learning Efficient On-Device Deep Networks Using Neural Projections", arXiv:1708.00630v2, Aug. 9, 2017, 12 pages.
Ravi, "Scalable Decipherment for Machine Translation via Hash Sampling", Meeting of the Association for Computational Linguistics, Aug. 4-9, 2013, Sofia, Bulgaria, pp. 362-371.
Schuster, "Speech Recognition for Mobile Devices at Google", Pacific Rim International Conference on Trends in Artificial Intelligence, Aug. 30-Sep. 2, 2010, Daegu, Korea, 3 pages.
Search Report and Written Opinion in Singapore Application No. 10201804213U, dated Dec. 31, 2019, 8 pages.
Search Report in Irish Application No. 2018/0149, dated Jul. 31, 2018, 10 pages.x.
Shi et al., "Hash Kernels for Structured Data", Journal of Machine Learning Research, vol. 10, 2009, pp. 2615-2637.
Shriberg et al., "The ICSI Meeting Recorder Dialog Act (MRDA) Corpus", SIGDIAL 2004 Workshop, The 5th Annual Meeting of the Special Interest Group on Discourse and Dialogue, Apr. 30 -May 1, 2004, Cambridge, MA, 4 pages.
Singleton, "Android Wear 2.0: Making the Most of Every Minute" Feb. 8, 2017, https://blog.google/products/android-wear/android-wear-20-make-most-every-minute/, Retrieved on Jun. 24, 2020, 6 pages.
Srivastava et al., "Dropout: A Simple Way to Prevent Neural Networks from Overfitting", Journal of Machine Learning Research, vol. 15, 2014, 30 pages.
Stolke et al., "Dialogue Act Modeling for Automatic Tagging and Recognition of Conversational Speech", Computational Linguistics, vol. 26, No. 3, 2000, 36 pages.
Stolke, "Entropy-Based Pruning of Backoff Language Models", arXiv:cs/0006025v1, Jun. 11, 2000, 5 pages.
Sutskever et al., "On the Importance of Initialization and Momentum in Deep Learning", International Conference on Machine Learning, Jun. 16-21, 2013, Atlanta, GA, 9 pages.

(56) References Cited

OTHER PUBLICATIONS

Sutskever et al., "Sequence to Sequence Learning with Neural Networks", Advances in Neural Information Processing System. Dec. 8-13, 2014, Montreal, Canada, 9 pages.

Theiler et al., "Sparse Matrix Transform for Fast Projection to Reduced Dimension", IEEE International Geoscience and Remote Sensing Symposium, Jul. 25-30, 2010, Honolulu, Hawaii, 5 pages.

Tran et al., "A Generative Attentional Neural Network Model for Dialogue Act Classification", 55$^{th}$ Annual Meeting of the Association for Computational Linguistics, Jul. 30-Aug. 4, 2017, Vancouver, Canada,, 6 pages.

Tur et al., "What Is Left To Be Understood In ATIS?", 2010 IEEE Spoken Language Technology Workshop, Dec. 12-15, 2010, Berkeley, CA, pp. 19-24.

Wang et al., "Learning to Hash for Indexing Big Data—A Survey", arXiv:1509.05472v1v1, Sep. 17, 2015, 22 pages.

Weinberger et al., "Feature Hashing for Large Scale Multitask Learning", arXiv:0902.2206v5, Feb. 27, 2010, 10 pages.

Wilensky et al., "The Projection Neural Network", International Joint Conference on Neural Networks (IJCNN), Jun. 7-11, 1992, Baltimore, MD, 10 pages.

Wojcik et al., "Training Neural Networks on High-Dimensional Data Using Random Projection", Pattern Analysis and Applications, vol. 22, Aug. 1, 2019, 11 pages.

Yang et al., "Revisiting Semi-Supervised Learning with Graph Embeddings", arXiv:1603.08861v2, May 26, 2016, 9 pages.

Yu et al., "Refining Word Embeddings for Sentiment Analysis", 2017 Conference on Empirical Methods in Natural Language Processing, Sep. 7-11, 2017, Denmark, Copenhagen, pp. 534-539.

Zhong et al., "Deep Hashing Learning Networks", arXiv:1507.04437v1, Jul. 16, 2015, 7 pages.

Zhu et al., "A Deep Neural Network Based Hashing for Efficient Image Retrieval", Conference on Systems, Man, and Cybernetics, Oct. 9-12, 2016. Budapest, Hungary, 6 pages.

\* cited by examiner

PRE-TRAINED PROJECTION NETWORKS FOR TRANSFERABLE NATURAL LANGUAGE REPRESENTATIONS

RELATED APPLICATIONS

The present application is based on and claims priority to U.S. Provisional Patent Application No. 62/805,498 filed Feb. 14, 2019. U.S. Provisional Patent Application No. 62/805,498 is hereby incorporated by reference in its entirety.

FIELD

The present disclosure relates generally to machine learning. More particularly, the present disclosure relates to systems and methods to pre-train projection networks for use as transferable natural language representation generators.

BACKGROUND

Neural language representations are at the core of many state-of-the-art natural language processing models. A widely used approach is to pretrain, store, and look up word or character embedding matrices. Some popular word embeddings are word2vec, GloVe, and ELMO. Approaches such as these which rely on pre-computed word embeddings can help initialize neural models, lead to faster convergence, and have improved performance for numerous application such as Question Answering, Summarization, Sentiment Analysis, and other similar tasks.

While useful, such pre-computed language representations occupy huge amounts of memory. For example, one entry (e.g., a d-dimensional embedding vector) must be stored for each different word or other language unit. As such, the amount of memory required to store the embedding matrix grows proportional with vocabulary size. Thus, a large amount of memory is required for a vocabulary of average size. Pruning the vocabulary may result in reduced memory requirements, but will also hinder the ability of the language representations to generalize to unknown words. In addition to memory requirements, a look up operation is required to obtain the embedding for a particular language input (e.g., word) from the embedding matrix.

More generally, the tremendous success of deep learning models and the explosion of mobile, IoT devices coupled together with increased emphasis on user privacy have led to the need for deploying deep learning models "on-device" for inference.

However, the memory requirements associated with pre-computed and stored language representations render them challenging to deploy on-device. Thus, improved techniques for generating language representations which are suitable for use on-device or in other resource-constrained settings are needed.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more processors and one or more non-transitory computer-readable media that collectively store a pre-trained projection network. The pre-trained projection network is configured to receive a language input comprising one or more units of text and to dynamically generate an intermediate representation from the language input. The pre-trained projection network includes a sequence of one or more projection layers, wherein each projection layer is configured to receive a layer input and apply a plurality of projection layer functions to the layer input to generate a projection layer output. The pre-trained projection network includes a sequence of one or more intermediate layers configured to receive the projection layer output generated by a last projection layer in the sequence of one or more projection layers and to generate one or more intermediate layer outputs, wherein the intermediate representation comprises the intermediate layer output generated by a last intermediate layer in the sequence of one or more intermediate layers. The computer-readable media collective store instructions that, when executed by the one or more processors, cause the computing system to perform operations. The operations include obtaining the language input; inputting the language input into the pre-trained projection network; and receiving the intermediate representation as an output of the pre-trained projection network.

Another example aspect of the present disclosure is directed to a computer-implemented method to pre-train a projection network comprising one or more projection layers and one or more intermediate layers, each projection layer configured to apply one or more projection functions to project a layer input into a different dimensional space, the projection network configured to receive an input and to generate an intermediate representation for the input. The method includes accessing, by one or more computing devices, a set of training data comprising a plurality of example inputs. The method includes inputting, by the one or more computing devices, each of the plurality of example inputs into the projection network. The method includes receiving, by the one or more computing devices, a respective intermediate representation for each of the plurality of example inputs as an output of the projection network. The method includes inputting, by the one or more computing devices, each respective intermediate representation into a decoder model configured to reconstruct inputs based on intermediate representations. The method includes receiving, by the one or more computing devices, a respective reconstructed input for each of the plurality of example inputs as an output of the decoder model. The method includes learning, by the one or more computing devices, one or more parameter values for the one or more intermediate layers of the projection network based at least in part on a comparison of each respective reconstructed input to the corresponding example input.

Another example aspect of the present disclosure is directed to computer-implemented method to pre-train a projection network comprising one or more projection layers and one or more intermediate layers, each projection layer configured to apply one or more projection functions to project a layer input into a different dimensional space, the projection network configured to receive an input and to generate an intermediate representation for the input. The method includes accessing, by one or more computing devices, a set of training data comprising a plurality of input words, wherein a respective set of ground truth context words are associated with each of the plurality of input words. The method includes inputting, by the one or more computing devices, each of the plurality of input words into the projection network. The method includes receiving, by the one or more computing devices, a respective intermediate representation for each of the plurality of input words as an output of the projection network. The method includes determining, by the one or more computing devices, a set of predicted context words for each of the plurality of input words based at least in part on the respective intermediate representation for each of the plurality of input words. The method includes learning, by the one or more computing devices, one or more parameter values for the one or more intermediate layers of the projection network based at least in part on a comparison, for each input word, of the respective set of predicted context words to the respective set of ground truth context words.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
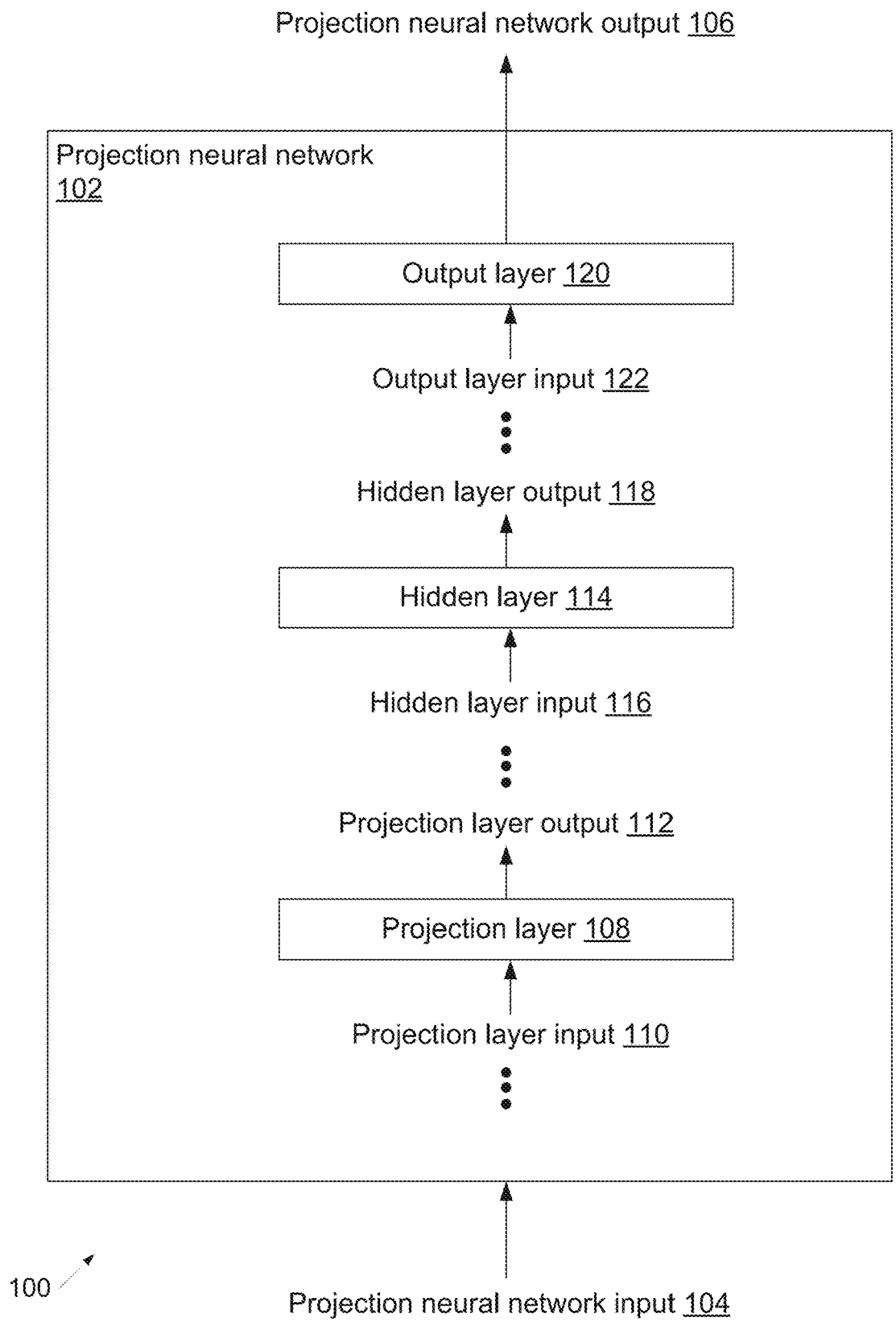
FIG. 1 shows an example projection neural network system according to example embodiments of the present disclosure.

Reference numerals that are repeated across plural figures are intended to identify the same features in various implementations.

DETAILED DESCRIPTION

Overview

Generally, the present disclosure is directed to systems and methods to pre-train projection networks for use as transferable natural language representation generators. In particular, example pre-training schemes described herein enable learning of transferable deep neural projection representations over randomized locality sensitive hashing (LSH) projections, thereby surmounting the need to store any embedding matrices because the projections can be dynamically computed at inference time.

More particularly, aspects of the present disclosure are directed to techniques for pre-training a projection network to produce an intermediate representation based on a language input. Once pre-trained, the intermediate representations generated by the projection network can be transferred or "plugged in" for use in performing any number of different natural language processing (NLP) tasks.

According to an aspect of the present disclosure, a projection network can include one or more projection layers and one or more intermediate layers. Each of the projection layers can apply one or more projection layer functions to project a layer input into a compact low-dimensional space. As an example, the projection layer functions can be modeled using LSH techniques and can be dynamically computed from the input.

The one or more intermediate layers can follow the one or more projection layers and can process a projection layer output generated by a last projection layer to produce the intermediate representation. For example, the intermediate representation can be the output of a last intermediate layer. In some implementations, the intermediate layers can be artificial neural network layers such as multi-layer perceptron layers. For example, some or all of the intermediate layers (e.g., all of the intermediate layers except the last intermediate layer) can be fully connected, feed-forward layers with non-linear activation functions.

Thus, a projection network can include projection layer(s) which project an input using projection functions and can further include intermediate layer(s) which include learnable parameters (e.g., weights, biases, and the like) that allow the projection network to be trainable and learn to produce powerful intermediate representations that can be easily plugged into NLP tasks and existing deep learning models.

In one example pre-training scheme, a projection network can be pre-trained as part of an autoencoder model that can be trained on unsupervised text. In particular, in some implementations, a projection network can be used to generate (e.g., encode) a language input (e.g., an input sentence) into an intermediate representation (e.g., a sentence representation). A decoder model (e.g., a recurrent neural network such as a long short-term memory network) can attempt to reconstruct the language input based on the intermediate representation (e.g., on a token-by-token basis).

The projection network and the decoder model can be jointly trained (e.g., as an end-to-end autoencoder) to maximize a probability of the reconstructed language input matching the original language input (e.g., on a token-by-token basis). In such fashion, the projection network can learn (in an unsupervised fashion) to produce intermediate representations (e.g., sentence representations) which encode sufficient information about the language inputs to enable reconstruction of the language input.

In another example pre-training scheme, a projection network can be pretrained in the form of a neural projection skip-gram model. In particular, a skip-gram based architecture can be coupled with projection layers (e.g., that perform LSH projections) to learn efficient and dynamically computable representations.

More particularly, in some implementations, a training dataset can include a plurality of input words and a plurality of sets of ground truth context words that respectively surround the plurality of input words within a training corpora. During pre-training, a projection network can receive one of the input words and can generate an intermediate representation for the input word. A skip-gram function can be used to generate a set of predicted context words that are predicted to surround the input word based on the intermediate representation for the input word.

Parameters of the projection network (e.g., parameters of the intermediate layers of the projection network) can be learned based on an objective function that compares the set of predicted context words for each input word to the set of ground truth context words for the input word. As one example, the parameters of the projection network can be learned through optimization of a negative sampling objective function that, in addition to the set of ground truth context words for an input word, compares the set of predicted context words for the input word to one or more sets of ground truth context words associated with other, different input words.

In addition, in some implementations, the objective function used to learn the parameters of the projection network can further include a regularization term that provides a penalty that has a magnitude that is positively correlated with a sum of a cosine similarity between the respective intermediate representations produced by the projection network for each pair of words in a training batch. In such fashion, the intermediate representations produced by the projection model are encouraged to be more spaced out in terms of cosine similarities, thereby leading to improved generalization.

Additionally, in some implementations, various perturbations can be applied to the training data (e.g., the input words) to enable the learned network to better generalize to out of vocabulary words and misspellings. Applying perturbations in this fashion can also assist in generating systems that are more resistant to adversarial attacks in natural language, for example, as compared to existing models like LSTMs.

After pre-training, the projection network can then be used as a transferable representation generator. For example, the pre-trained projection network can be easily plugged into various different NLP tasks and existing deep learning models. Thus, in some examples, one or more machine-learned prediction models can be trained to produce predictions (e.g., classifications) based on the intermediate representations produced by a pre-trained projection network for a given language input. Alternatively or additionally, the intermediate representations produced by a pre-trained projection network can be directly used to perform various tasks such as, for example, clustering and/or similarity search.

The systems and methods of the present disclosure provide a number of technical effects and benefits. As one example, in contrast to approaches like word2vec which rely on precomputation and storage of large embedding matrices, the pre-trained projection networks do not need to store lookup tables. Instead, the language representations are computed on-the-fly and require low memory footprint. Thus, aspects of the present disclosure enable the generation and use of language representations with significantly reduced memory requirements, which make the techniques described herein significantly more suitable for use on-device or in other resource-constrained environments.

As another example technical effect and benefit, the pre-training schemes described herein enable training of the projection networks to produce language representations in an unsupervised fashion. Thus, significant amounts of time and resources do not need to be dedicated to manual labelling. Instead, the projection networks can be pre-trained using unsupervised techniques and then re-fined and/or paired with one or more specialized prediction models (e.g., classification heads) trained using a very small amount of labeled training data.

Further, the language representations provided by the projection networks can be easily transferred between or applied to many different NLP tasks. Thus, a single projection network can be used to generate language representations which can then be used by different downstream models/processes to perform different NLP tasks. In such fashion, only a single projection network needs to be trained, rather than multiple different models. Similarly, only a single projection network needs to be run to produce an inference, rather than multiple different models. This saves computing resources since a fewer number of training iterations and/or model runs need to be performed, thereby conserving memory space, processing power, energy expenditure, and the like.

Additionally, the structure of the projection network itself provides technical effects and benefits. For example, as compared to models that use stored language embedding tables, projection models reduce the memory occupied by the model from $O(|V|)$ to $O(n_\mathbb{P})$, where $|V|$ refers to the vocabulary size and $n_\mathbb{P}$ refers to number of projection operation. Two key advantages of the projection-based representations over word embeddings are: they are fixed and have low memory size; they can handle out of vocabulary words.

Thus, a projection network as described in this specification can enable a system to perform tasks faster and with a performance level (e.g., a prediction accuracy) that is similar to that of much larger and more complex conventional neural networks (i.e., neural networks that do not contain projection layers, as described in this specification), while consuming fewer computational resources (e.g., memory and computing power). For example, in some cases, a projection network can enable a system to perform tasks (e.g., text classification) with a performance level comparable to that of a larger neural network, despite the projection network having several orders of magnitude fewer parameters than the larger neural network. Projection networks can perform tasks faster and consume fewer computational resources than conventional neural networks because they include projection layers. Projection networks as described herein can be more resistant to adversarial attacks in natural language, for example, as compared to existing models like LSTMs.

Furthermore, although the present disclosure discuss the projection networks with particular reference to language inputs and intermediate language representations, the pre-training techniques and resulting projection networks described herein are not limited to natural language processing tasks. Instead, the projection networks can be pre-trained and used to generate intermediate representations of many different modalities of data include image data (e.g., video), audio data (e.g., speech data), and/or other forms of data.

Example implementations of aspects of the present disclosure are described in U.S. Provisional Patent Application No. 62/805,498. U.S. Provisional Patent Application No. 62/805,498 is incorporated by reference herein in its entirety. U.S. Provisional Patent Application No. 62/805,498 provides examples of how aspects of the present disclosure can be implemented. The present disclosure is not limited to the particular examples contained in U.S. Provisional Patent Application No. 62/805,498.

With reference now to the Figures, example embodiments of the present disclosure will be discussed in further detail.

Example Applications

One example task that can be performed using pre-trained projection networks is text classification. In the text classification task, the system including the projection network is given text and/or intermediate features derived from text and considers all terms and/or features to make a single classification (e.g., binary or multi-class classification). Thus, in one example, the input is a text and the output is a class label.

Example applications of the classification task in natural language processing include: dialog act classification; humor & sarcasm detection; sentiment analysis; question classification; news headline classification; emotion recognition; health notifications; intent classification (dialog); and automated essay scoring.

Some samples of example text classification tasks and applications are as follows:

| Dialog Act Classification | | |
| --- | --- | --- |
| Person Talking | Input | Output |
| A | You're a, so you're a senior now | DECLARATIVE-QUESTION |
| B | Yeah | YES-ANSWER |
| B | I'm working on my projects trying to graduate | STATEMENT |
| A | Oh, good for you | APPRECIATION |
| B | Yeah | BACKCHANNEL |

Humor & Sarcasm Detection
Input: I love being ignored
Output: SARCASM
Sentiment Analysis
Input: The ravioli just keeps getting better every time I visit.
Output: POSITIVE
Question Classification
Input: How did serfdom develop in and then leave Russia?
Output: DESC:MANNER
Input: How much would it cost to purchase a 2footsquare party tent, with sides, ?
Output: NUM:MONEY
News Headline Classification
Input: TeleCorp confirms it is buying ad platform App-Corp, reportedly for between $1.6B$2B
Output: Business
Emotion Recognition
Input: Wow I never saw that coming!
Output: SURPRISE
Intent Classification (Dialog Systems)
Input: Play levels on YouTube
Output: INTENT_PLAY_SONG_ON_DEVICE_NAME
Another example task that can be performed by a system that includes a pre-trained projection network is sequence labeling. In the sequence labeling task, the system including the projection network is given text and/or intermediate features derived from text and identifies segments (e.g., sequences of words/phrases) and classifies those segments into multiple classes. Thus, in one example, the input is a text and the output is labeled sequences.

Example applications of the sequence labeling task in natural language processing include: named entity recognition; keyphrase extraction; noun phrase extraction; chunking; relation extraction; semantic parsing; slot extraction in dialog systems; product (shopping) & attribute extraction; and aspect based sentiment analysis. Additional example applications include translating text between languages; text completion (e.g., sentence completion and/or automatic reply); or other generative tasks. Some example tasks and applications are as follows.

Named Entity Recognition:
Input: The University of Southern California is located in Los Angeles.
Output: The [University of Southern California]_Organization is located in [Los Angeles]_Location
KeyPhrase Extraction (Useful for Advertising and Content Understanding):
Input: We offer a wide variety of items including healthy dry cat food for $5.
Output: We offer a wide variety of items including [healthy dry cat food]_KeyPhrase for $5.
Noun Phrase Extraction:
Input: Huge hurricanes struck the coast of Japan.
Output: [Huge hurricanes] Noun_Phrase struck [the coast] Noun_Phrase of [Japan] Noun_Phrase
Chunking:
Input: Huge hurricanes struck the coast of Japan.
Output: [Huge hurricanes]_Noun_Phrase [struck]_Verb_Phrase [[the coast]_Noun_Phrase [of]_Prep [Japan]_Noun_Phrase]]_Prep Noun_Phrase
Relation Extraction:
Input: CorporationA was acquired by CorporationB to create synergies.
Output: [[CorporationA]_e1 was acquired by [CorporationB]_e2] _purchase(e2,e1) to create synergies.
Semantic Parsing:
Input: Remind me to set the timer to 5.
Output: [Remind]_Evoking [me]_Creator to [set]_Intentionally_Create [the timer]_Created_Entity to 5.
Slot Extraction in Dialog Systems:
Input: Reserve a flight from San Francisco to LAX for two people after 3 pm.
Output: [Reserve a flight]_Book_Flight_Intent from [San Francisco]_FromDestination:Location/Airport to [LAX]_ToDestination:Location/Airport for [two people]_Number_of_People after [3 pm]_Date_and_Time.
Product (Shopping) & Attribute Extraction:
Input: This expensive shirt ripped all the way to my shoulder, the fabric is too soft.
Output: This [expensive]_price [shirt]_product ripped all the way to my shoulder, the [fabric]_textile was too soft and runs [small]_size.
Aspect Based Sentiment Analysis:
The task is to identify every entity E and attribute A pair towards which an opinion is expressed in the given text.
Input: The flank steak was great, but the service was horrible.
Output: The [flank steak]_Sentiment:Positive was great, but the [service]_Sentiment:Negative and [ambience]_Sentiment:Negative were horrible.
Translation:
Input: I like to dance the tango.
Output: Me gusta bailar el tango.
Text Completion/Generation:
Input: A zebra has black and white
Output: stripes Example Projection Networks and Projection Layers FIG. 1 shows an example projection neural network system 100. The projection neural network system 100 is an example of a system implemented as computer programs on one or more computers in one or more locations in which the systems, components, and techniques described below are implemented.

The projection neural network system 100 includes a projection neural network 102. The projection neural network 102 can be a feed-forward neural network, a recurrent neural network, or any other appropriate type of neural network.

The projection neural network 102 is configured to receive a projection neural network input 104 and to generate a projection network output 106 from the projection network input 104. The projection neural network input 104 can be any kind of digital data input, and the projection network output 106 can be any kind of score, classification, or regression output based on the input.

The system 100 described herein is widely applicable and is not limited to one specific implementation. However, for illustrative purposes, a small number of example implementations are described below.

For example, if the inputs to the projection neural network 102 are images or features that have been extracted from images, the output generated by the projection neural network 102 for a given image may be scores for each of a set of object categories, with each score representing an estimated likelihood that the image contains an image of an object belonging to the category.

As another example, if the input to the projection neural network 102 is a sequence of text in one language, the output generated by the projection neural network 102 may be a score for each of a set of pieces of text in another language, with each score representing an estimated likelihood that the piece of text in the other language is a proper translation of the input text into the other language.

As another example, if the input to the projection neural network 102 is a sequence representing a spoken utterance, the output generated by the projection neural network 102 may be a score for each of a set of pieces of text, each score representing an estimated likelihood that the piece of text is the correct transcript for the utterance.

As another example, if the input to the projection neural network 102 is a sequence of physiological measurements, the output generated by the projection neural network 102 may be a score for each of a set of possible diagnoses for the condition of a user, with the score representing an estimated likelihood that the diagnosis is accurate.

As another example, if the input to the projection neural network 102 is a sequence of text from a received communication, the output generated by the projection neural network 102 may be a score for each of a set of possible responses to the received communication, with the score representing an estimated likelihood that the response matches a user's intent.

The projection neural network 102 includes a sequence of one or more projection layers (e.g., the projection layer 108). Although only a single projection layer 108 is illustrated, the projection neural network 102 can include any number of projection layers (e.g., stacked one after the other).

As will be described further with reference to FIG. 2, the projection layer 108 is configured to receive a projection layer input 110, and to process the projection layer input 110 in accordance with current values of projection layer parameters to generate a projection layer output 112. In general, the projection layer input 110 may be the projection network input 104 (i.e., if the projection layer 108 is the first layer in the projection network 102) or the output of another layer of the projection network 102 (e.g., a conventional layer or another projection layer). The projection layer input 110 and the projection layer output 112 may be represented in any appropriate numerical format, for example, as vectors or as matrices.

Figure 2:
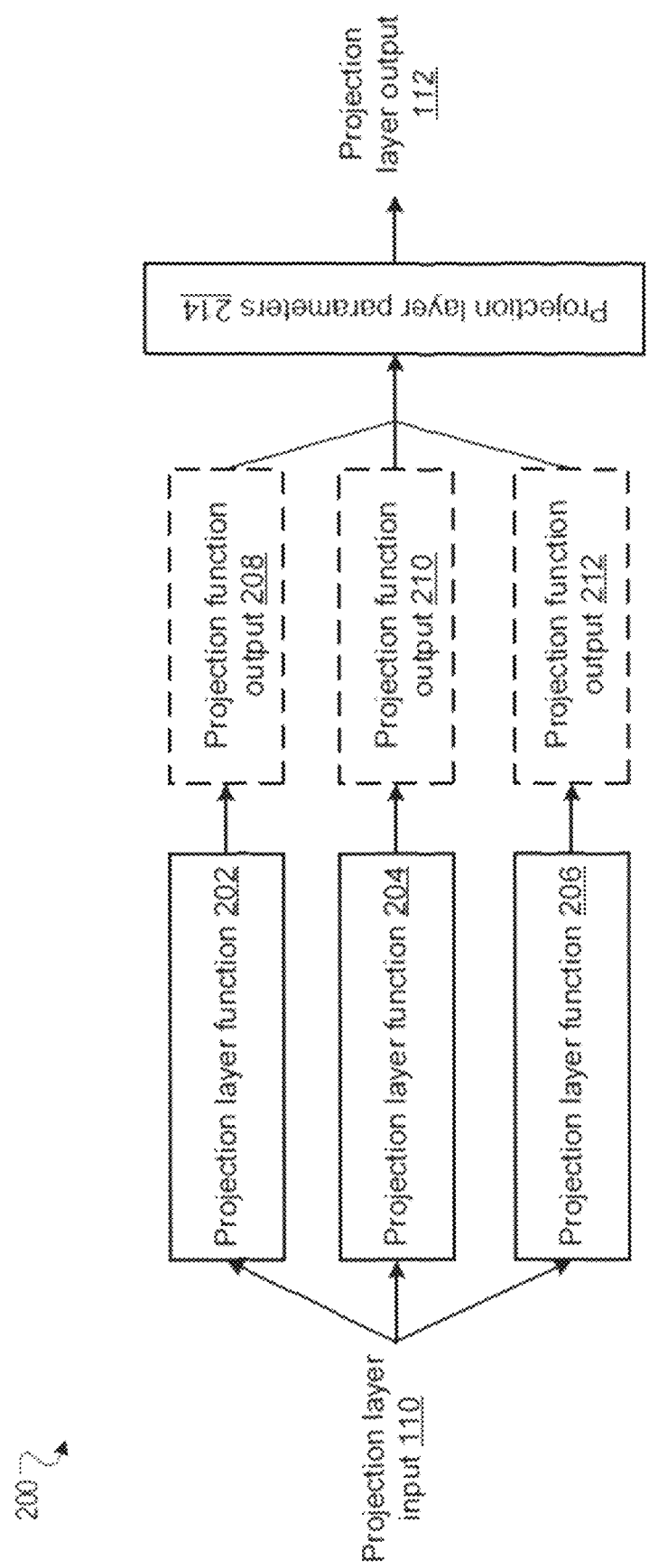
FIG. 2 depicts a block diagram of an example data flow for processing a projection layer input to determine a projection layer output according to example embodiments of the present disclosure.

FIG. 2 is a block diagram of an example data flow 200 by which a projection layer (e.g., the projection layer 108) can process a projection layer input 110 to determine a projection layer output 112.

As described earlier, the projection layer input may be the projection network input or the output of another layer of the projection network, and may be represented in any appropriate numerical format (e.g., as a vector or as a matrix).

The projection layer provides the projection layer input 110 to each of one or more projection layer functions (e.g., 202, 204, 206). Each of the projection layer functions processes the projection layer input 110 to generate a respective projection function output (e.g., 208, 210, 212).

In particular, each projection function can generate the corresponding projection function output by mapping the projection layer input to a different space. Generally, the dimensionality of the projection function outputs are much less (e.g., by several orders of magnitude) than the dimensionality of the projection layer input 110. In one example, each of the projection function outputs (e.g., 208, 210, 212) is a bit vector.

In some implementations, each projection function may be defined by a matrix. The rows (or columns) of a matrix defining a projection function can be referred to as projection vectors associated with the projection function. In some cases, a projection function may process the projection layer input by determining dot products (i.e., inner products) between the projection layer input and each of the projection vectors associated with the projection function. For example, for a projection function $\mathbb{P}$, the projection function output $\mathbb{P}(x)$ for projection layer input x (that is represented as a vector) may be determined as:

$$\mathbb{P}(x)=[<x,P_1>,<x,P_2>,\ldots,<x,P_n>] \quad (1)$$

where $<\cdot,\cdot>$ denotes the dot product operation between vectors, and $\{P_i\}_{i=1}^n$ are the projection vectors associated with the projection function $\mathbb{P}$.

In some implementations, a projection function may process the projection layer input by determining whether the dot product between the projection layer input and each of the projection vectors results in positive or negative values. When a dot product between the projection layer input and a projection vector results in a positive value, a first value may be assigned to a corresponding position in the projection function output. Conversely, when a dot product between the projection layer input and a projection vector results in a negative value, a second value may be assigned to a corresponding position in the projection function output. For example, the projection function output $\mathbb{P}(x)$ for projection layer input x (that is represented as a vector) may be determined as:

$$\mathbb{P}(x)=[\text{sgn}(<x,P_1>),\text{sgn}(<x,P_2>),\ldots,\text{sgn}(<x,P_2>)] \quad (2)$$

where sgn($\cdot$) is the sign function, which outputs value 1 in response to receiving a positive input, and outputs value 0 in response to receiving a negative input. In this example, the projection function output is a binary representation (i.e., a vector with components consisting of 0s and 1s) of the projection layer input. By representing the projection function outputs as binary representations, the memory footprint of the projection network (i.e., the quantity of memory required to store and use the projection network) can be significantly reduced compared to conventional networks (i.e., where layer outputs are represented as real number representations instead of binary representations).

In some implementations, the projection functions may be locality sensitive hashing functions. Generally, a locality sensitive hashing function maps similar inputs to similar outputs. More specifically, a locality sensitive hashing function may be defined as a function $\mathbb{P}$ so that if a similarity between inputs $x_1$ and $x_2$ is defined by a mapping $\varphi(x_1, x_2)$ (e.g., a cosine similarity mapping) whose output value is between 0 and 1, then the probability that $\mathbb{P}(x_1) = \mathbb{P}(x_2)$ is equal to $\varphi(x_1, x_2)$. In some cases, the projection function defined by (2) may be an example of a locality sensitive hashing function.

One benefit of using locality sensitive hashing functions is that it allows projection of similar inputs or intermediate network layers into hidden unit vectors that are nearby in metric space. This allows transformation of the inputs and learning of an efficient and compact network representation that is only dependent on the inherent dimensionality (i.e., observed features) of the data rather than the number of instances or the dimensionality of the actual data vector (i.e., overall feature or vocabulary size). For example, this can be achieved with binary hash functions for the projection functions.

Projection functions may be selected so that: (i) processing a projection layer input by a projection function to generate a projection function output is computationally efficient (e.g., requires few arithmetic operations), (ii) data defining a projection function can be efficiently stored (e.g., in a logical data storage area or physical data storage device), or both.

For example, one or more of the projection functions may be defined by sparse matrices (i.e., matrices with only a few non-zero entries). If a projection function is defined by a sparse matrix, then processing the projection layer input by the projection function to generate the projection function output is computationally efficient. Specifically, since the results of many of the arithmetic operations involved in computing the projection function output have value zero (due to the sparsity of the matrix defining the projection function), these arithmetic operations do not actually need to be performed.

Moreover, if a projection function is defined by a sparse matrix, then the data defining the projection function can be efficiently stored. For example, a sparse matrix may be stored as a list of tuples, where each tuple includes an index of a location in the sparse matrix and a corresponding value of the sparse matrix at the index. Since sparse matrices have only a few non-zero entries, such a representation occupies less memory than, for example, a representation of a dense matrix that must include the index of every location in the dense matrix and the corresponding value of the dense matrix at the index.

As another example, the system may determine the values of the components of the matrices defining one or more of the projection functions based on the values of a set of seed parameters. The seed parameters are represented as numerical values and the number of seed parameters is typically much smaller than the dimensionality of the matrices defining the projection functions. The system may, for example, determine the values of the components of the matrices defining the projection functions based on the outputs of random (or pseudo-random) number generators that are initialized using the seed parameters. In this example, when the random (or pseudo-random) number generators are configured to generate Normally-distributed random numbers (i.e., random numbers drawn from a Normal distribution), the values of the components of the matrices defining the projection functions are approximately Normally-distributed.

By using seed parameters to determine the values of the components of the matrices defining the projection functions, the system can reduce the computational requirements of projection layers compared to conventional layers. For example, the system can reduce the amount of memory storage required for projection layers compared to conventional layers, since only the values of the seed parameters must be stored, as compared to some conventional layers that require storing entire dense matrices of conventional layer parameter values. As another example, the system can reduce the latency in generating layer outputs compared to conventional layers, since the system can dynamically compute the values of the components of the matrices defining the projection functions. In contrast, for some conventional layers, the system reads the conventional layer parameter values from memory, which may be a substantially slower process than dynamically computing these values (i.e., as in an example projection layer).

In some implementations, the values of the parameters defining the projection layer functions (e.g., the seed parameters or the values of the components of the projection vectors) may be predetermined, that is, may be fixed before the projection network is trained, and are not adjusted during training.

The projection layer can concatenate the projection function outputs and apply the projection layer parameters 214 (e.g., a parameter matrix and a bias vector) to the concatenated projection function outputs.

Thus, the projection layer can generate the projection layer output by applying projection layer parameters to the projection function outputs. For example, the projection layer parameters may include a parameter matrix and a bias vector, and the projection layer may generate the projection layer output y as:

$$y = W \cdot x + b \quad (3)$$

where W is the parameter matrix (i.e., so that $W \cdot x$ represents a matrix-vector multiplication), b is the bias vector, and x is the concatenation of the projection function outputs.

As described earlier, the dimensionality of the projection function outputs is generally much lower than the dimensionality of the projection layer input. Therefore, the number of projection layer parameters that are applied to the projection function outputs to generate the projection layer outputs is generally much lower than the number of parameters that are applied to layer inputs by conventional neural network layers (e.g., fully-connected layers) that do not include projection functions. For example, the dimensionality of the projection layer parameters defined by the parameter matrix W and the bias vector b in the projection layer may be much smaller than the dimensionality of the corresponding layer parameters of a conventional neural network layer.

Referring again to FIG. 1, according to an aspect of the present disclosure, in some implementations, the projection neural network 102 can include a stack of one or more additional hidden layers (e.g., hidden layer 114) connected to the sequence of one or more projection layers (e.g., projection layer 108). Although a single hidden layer 114 is shown, any number of additional hidden layers can be included in the network 102. The one or more hidden layers can include different types of layers including fully connected layers (e.g., featuring non-linear activations), recurrent layers, convolutional layers, additional projection layers, projection sequence layers (described in further detail below), other forms of additional layers, and/or various combinations thereof.

The sequence of the one or more additional hidden layers can be configured to receive a layer output generated by a highest projection layer in the sequence of one or more projection layers and to generate one or more additional hidden layer outputs. That is, each hidden layer (e.g., hidden layer 114) can receive a hidden layer input (e.g., hidden layer input 116) and process the layer input to provide a hidden layer output (e.g., hidden layer output 118).

Following the sequence of one or more hidden layers (e.g., hidden layer 114), the projection neural network 102 can include an output layer 120. The output layer 120 can be configured to receive the additional hidden layer output generated by a highest additional hidden layer in the sequence of one or more additional hidden layers and to generate the projection network output 106.

A layer of the projection network 102 can serve as the output layer 120 if the output of such layer is included in the projection network output 106. An output layer may be a softmax layer, a projection layer, or any other appropriate neural network layer. The output layer 120 may be configured to receive as input an output generated by a projection layer or a conventional layer.

The system 100 can be implemented in a resource-constrained environment (e.g., a smartwatch or smartphone) more readily than conventional neural network systems. For example, by including projection layers (e.g., the projection layer 108) in place of conventional neural network layers (e.g., fully-connected layers), data defining the parameters of the system 100 can occupy much less storage capacity than data defining the parameters of a conventional neural network system.

This specification describes the operations performed by a projection layer (e.g., as described with reference to FIG. 2) in the context of a projection neural network (e.g., as described with reference to FIG. 1). More generally, other systems, such as graph-based systems, can incorporate the operations performed by a projection layer. A graph is a data structure that may be represented by a set of nodes (where each node may be associated with a numerical feature vector), a set of edges (where each edge may be associated with a numerical edge strength value), and in some cases, a set of labels. The nodes represent entities (e.g., people, objects, locations, or concepts), the edges represent relationships between the entities represented by the nodes (e.g., a "friend" relationship between two people in a social network), and in some cases, the labels may represent characteristics of the nodes (e.g., whether a product represented by a node is a "best-selling" product).

Graph-based systems can be trained by machine learning techniques (e.g., supervised or semi-supervised machine learning techniques) to make predictions. For example, a graph-based system may generate a prediction for a value of a label associated with a previously unlabeled node in a graph. In this example, the graph-based system may generate a prediction for a value of a label associated with a given node based on the labels of the neighboring nodes (i.e., nodes that are connected to the given node by an edge) and the edge strengths of the edges connecting the given node to the neighboring nodes.

A graph-based system can incorporate the operations performed by a projection layer by, for example, generating a projection graph that is a compact representation of a trainer graph. Each node of the projection graph may correspond to a different node of the trainer graph, and the feature vectors associated with the nodes of the projection graph may be determined by performing projection layer operations. More specifically, the feature vector associated with a particular node of the projection graph may be determined by applying multiple projection functions followed by a transformation (e.g., defined by a parameter matrix and a bias vector) to the feature vector associated with the corresponding node in the trainer graph. In this manner, the feature vectors associated with the nodes of the projection graph may have a much smaller dimensionality than the feature vectors associated with the nodes of the trainer graph. Therefore, similar to a projection neural network, the projection graph may be suitable for deployment to resource constrained environments (e.g., mobile devices) where the trainer graph could not be deployed.

As mentioned above, the system 100 described herein is widely applicable and is not limited to one specific implementation. However, other examples of specific implementations (in addition to those described above) may be as described below.

For example, if the inputs to the projection neural network 102 are Internet resources (e.g., web pages), documents, or portions of documents or features extracted from Internet resources, documents, or portions of documents, the output generated by the projection neural network 102 for a given Internet resource, document, or portion of a document may be a score for each of a set of topics, with each score representing an estimated likelihood that the Internet resource, document, or document portion is about the topic.

As another example, if the inputs to the projection neural network 102 are features of an impression context for a particular advertisement, the output generated by the projection neural network 102 may be a score that represents an estimated likelihood that the particular advertisement will be clicked on.

As another example, if the inputs to the projection neural network 102 are features of a personalized recommendation for a user, e.g., features characterizing the context for the recommendation, e.g., features characterizing previous actions taken by the user, the output generated by the projection neural network 102 may be a score for each of a set of content items, with each score representing an estimated likelihood that the user will respond favorably to being recommended the content item.

Example Self-Governing Neural Networks

Example Models

Example implementations of the network structure shown in FIG. 1 include the Self-Governing network described herein. In particular, a Self-Governing neural network (SGNN) can include multi-layered locality-sensitive projection model. The self-governing property of this network stems from its ability to learn a model (e.g., a classifier) without having to initialize, load, or store any feature or vocabulary weight matrices. In this sense, the SGNN represents a truly embedding-free approach, which is in contrast with the majority of the widely-used state-of-the-art deep learning techniques in natural language processing whose performance depends on embeddings pre-trained on large corpora.

Instead, the SGNN uses the projection functions to dynamically transform each input to a low-dimensional representation. Furthermore, these projection layer(s) can be stacked with additional layers and non-linear activations to achieve deep, non-linear combinations of projections that permit the network to learn complex mappings from inputs $x_i$ to outputs $y_i$. One example of an SGNN network is represented mathematically below:

$$i_p = [\mathbb{P}^1(x_i), \ldots, \mathbb{P}^T(x_i)] \quad (4)$$

$$h_p = \sigma(W_p \cdot i_p + b_p) \quad (5)$$

$$h_t = \sigma(W_t \cdot h_{t-1} + b_t) \quad (6)$$

$$y_i = \text{softmax}(W_o \cdot h_k + b_o) \quad (7)$$

where $i_p$ refers to the output of projection operation applied to input $x_i$, $h_p$ is applied to projection output, $h_t$ is applied at intermediate layers of the network with depth k followed by a final softmax activation layer at the top. $W_p$, $W_t$, $W_o$ and $b_p$, $b_t$, $b_o$ represent trainable weights and biases respectively.

In some implementations, the projection transformations can use pre-computed parameterized functions, i.e., they are not trained during the learning process, and their outputs can be concatenated to form the hidden units for subsequent operations.

In some implementations, each input text $x_i$ can be converted to an intermediate feature vector (e.g., via raw text features such as skip-grams) followed by projections.

$$x_i \xrightarrow{F} \vec{x}_i \xrightarrow{P} [\mathbb{P}^1(x_i), \ldots, \mathbb{P}^T(x_i)] \quad (8)$$

As examples, the intermediate feature vector can include one or more of the following intermediate features generated from or associated with the input text: skip-grams; n-grams; part of speech tags; dependency relationships; knowledge graph information; and/or contextual information.

In some implementations, the SGNN network can be trained from scratch on the task data using a supervised loss defined with respect to ground truth $\hat{y}_i$. One example loss function that can be used is as follows:

$$\mathcal{L}(.) = \sum_{i \in N} \text{cross} - \text{entropy}(y_i, \hat{y}_i) \quad (9)$$

Figure 5A:
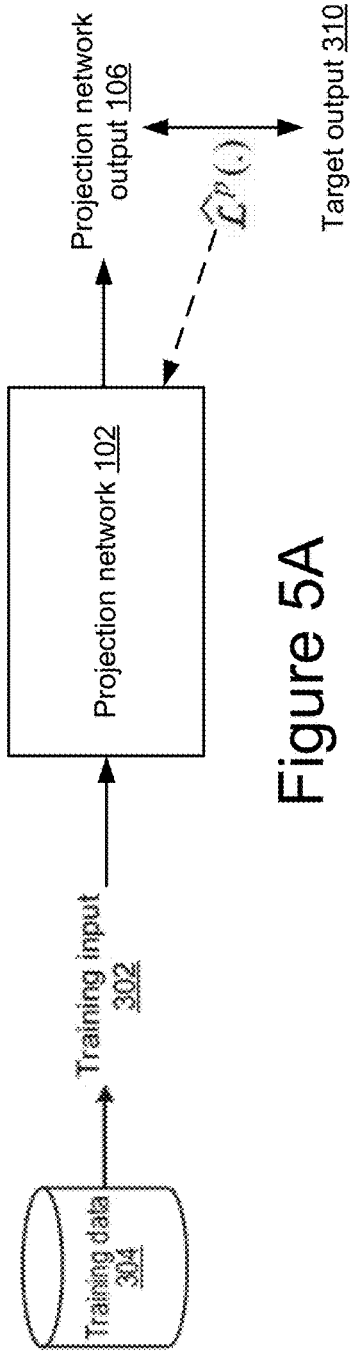
FIGS. 5A and 5B depict block diagrams of example data flows for training a projection neural network according to example embodiments of the present disclosure
Figure 5B:
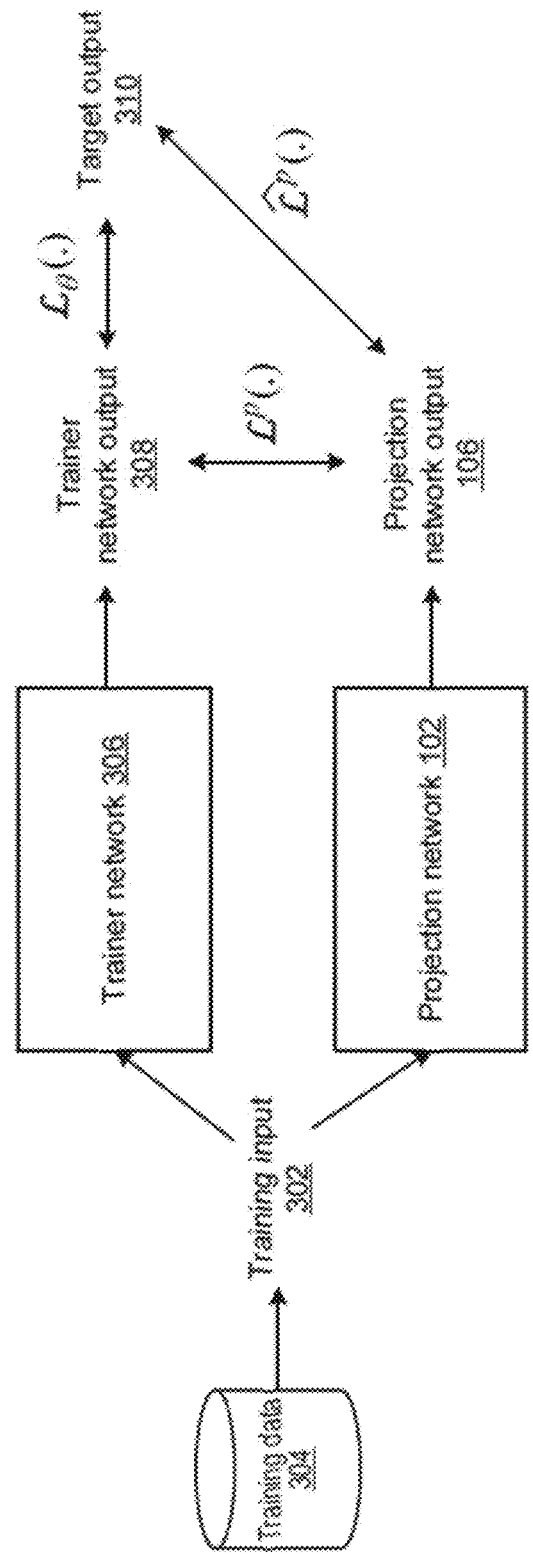

An example training structure according to the above-described scheme is provided in FIG. 5A. FIG. 5B shows an alternative training structure.

During training, the network learns to choose and apply specific projection operations $\mathbb{P}^j$ (via activations) that are more predictive for a given task. The choice of the type of projection matrix $\mathbb{P}$ as well as representation of the projected space $\Omega_\mathbb{P}$ has a direct effect on computation cost and model size. As described above, in some implementations, an efficient randomized projection method can be leveraged and a binary representation $\{0,1\}^d$ can be used for $\Omega_\mathbb{P}$. This yields a drastically lower memory footprint both in terms of number and size of parameters.

Computing Projections: In some implementations, an efficient randomized projection method can be employed for the projection step. For example, as described above, locality sensitive hashing (LSH) can be used to model the underlying projection operations in SGNN. LSH enables the network to project similar inputs $\vec{x}_i$ or intermediate network layers into hidden unit vectors that are nearby in metric space. In some implementations, repeated binary hashing can be used for $\mathbb{P}$ and the projection vectors can be applied to transform the input $\vec{x}_i$ to a binary hash representation denoted by $\mathbb{P}_k(\vec{x}_i) \in \{0,1\}$, where $[\mathbb{P}_k(\vec{x}_i)] = \text{sgn}[\langle \vec{x}_i, \mathbb{P}_k \rangle]$. This results in a d-bit vector representation, one bit corresponding to each projection row $\mathbb{P}_{k=1 \ldots d}$.

The same projection matrix $\mathbb{P}$ is used for training and inference. Further, in some implementations, the random projection vector $\mathbb{P}_k$ never needs to be explicitly stored since they can be computed on the fly using hash functions over feature indices with a fixed row seed rather than invoking a random number generator. This also permit performance of projection operations that are linear in the observed feature size rather than the overall feature or vocabulary size which can be prohibitively large for high-dimensional data, thereby saving both memory and computation cost.

Thus, SGNN can efficiently model high-dimensional sparse inputs and large vocabulary sizes common for text applications instead of relying on feature pruning or other pre-processing heuristics employed to restrict input sizes in standard neural networks for feasible training. The binary representation is significant since this results in a significantly compact representation for the projection network parameters that in turn considerably reduces the model size.

SGNN Parameters: In some implementations, T different projection functions $\mathbb{P}^{j=1 \ldots T}$ can be employed, each resulting in d-bit vector that is concatenated to form the projected vector $i_p$ in Equation (4). T and d can be varied depending on the projection network parameter configuration specified for $\mathbb{P}$ and can be tuned to trade-off between prediction quality and model size. Note that the choice of whether to use a single projection matrix of size T·d or T separate matrices of d columns depends on the type of projection employed (dense or sparse).

Figure 3:
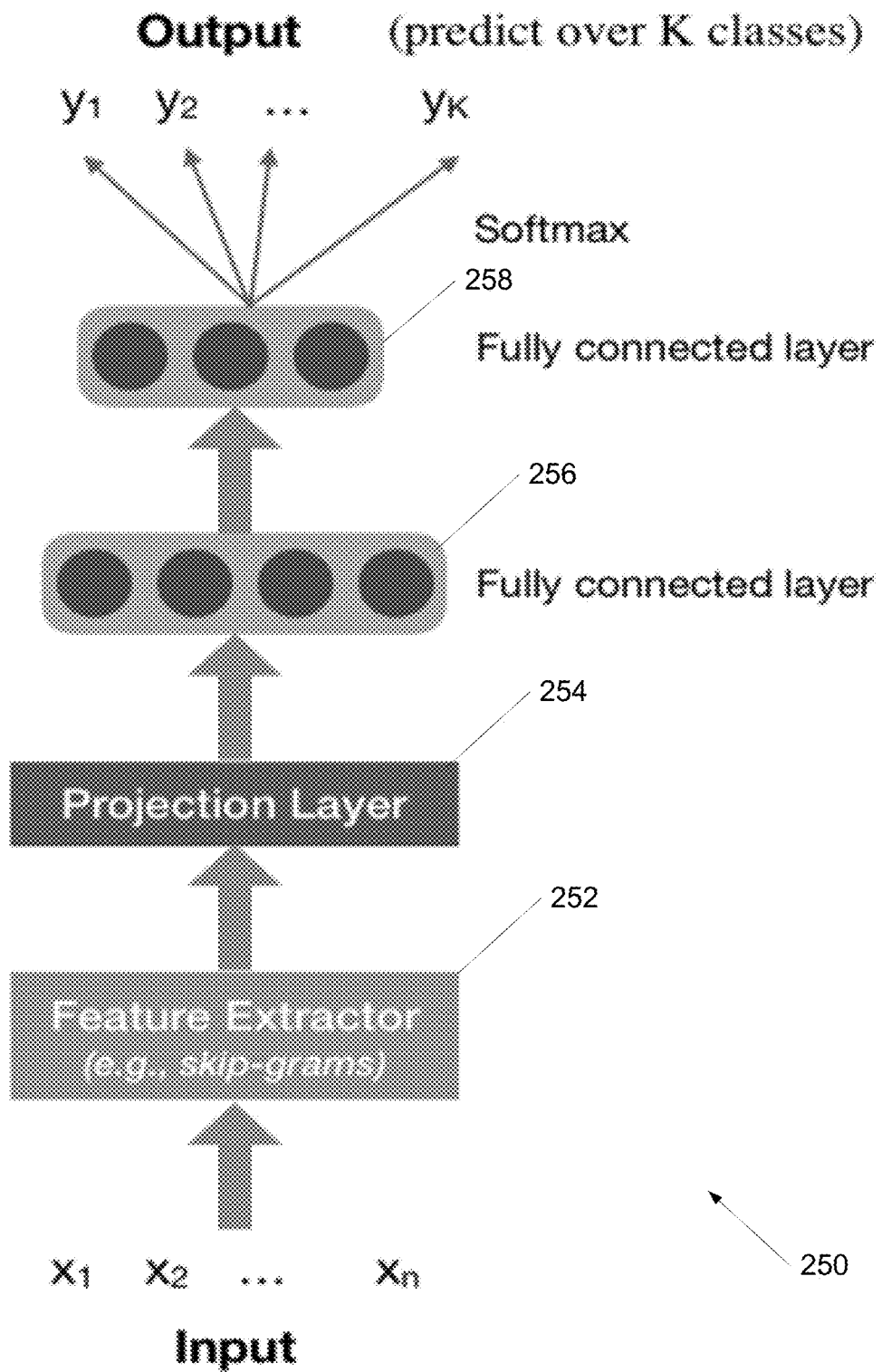
FIG. 3 depicts an example Self-Governing Neural Network according to example embodiments of the present disclosure.

FIG. 3 depicts an example SGNN 250 according to example embodiments of the present disclosure. The SGNN 250 receives an input, which, in some implementations, can be sequential in nature (e.g., words in a sequence). The SGNN 250 can first include a feature extractor 252. In some instances, the feature extractor 252 can be viewed as part of the network 250 while in other instances the feature extractor 252 is viewed as a pre-processing step for the network 250. The feature extractor 252 can extract an intermediate feature vector from the input. The feature extractor 252 can provide the intermediate feature vector to a projection layer 254.

Thus, in some implementations, the input to the projection layer 254 can include a single input vector that has been generated on the basis of the entire input $x_1, \ldots, x_n$ and additional features derived from or otherwise associated with the input. Such multiple types of information can be concatenated to form the single input vector. The SGNN 250 can process the single input vector to produce a classification output that classifies the input as a whole.

The projection layer 254 can project the received vector into a lower-dimensional space, for example as described with reference to FIG. 2. Following the projection layer 254, the example SGNN includes one additional hidden layer, shown here as a fully connected layer 256. Following the fully connected layer 256 is a softmax output layer 258. The output of the softmax layer 258 is a prediction (e.g., text classification) for the input over K classes.

Example Training and Inference

In some implementations, the compact bit units can be used to represent the projection in SGNN. During training, the network can learn to move the gradients for points that are nearby to each other in the projected bit space $\Omega_\mathbb{P}$ in the same direction.

In some implementations, the SGNN network can be trained end-to-end using backpropagation. Training can progress efficiently, for example, with stochastic gradient descent with distributed computing on high-performance CPUs or GPUs.

Complexity: The overall complexity for SGNN inference, governed by the projection layer, is O(n·T·d), where n is the observed feature size (not the overall vocabulary size) which is linear in input size, d is the number of LSH bits specified for each projection vector $\mathbb{P}_k$, and T is the number of projection functions used in $\mathbb{P}$. The model size (in terms of number of parameters) and memory storage required for the projection inference step is O(T·d·C), where C is the number of hidden units in $h_p$ in the multi-layer projection network.

Example Applications

One example task that can be performed by SGNNs is text classification. In the text classification task, the neural network is given text and/or intermediate features derived from text and considers all terms and/or features to make a single classification (e.g., binary or multi-class classification). Thus, in one example, the input is a text and the output is a class label.

Example applications of the classification task in natural language processing include: dialog act classification; humor & sarcasm detection; sentiment analysis; question classification; news headline classification; emotion recognition; health notifications; intent classification (dialog); and automated essay scoring.

Some samples of example text classification tasks and applications are as follows:

| Dialog Act Classification | | |
| --- | --- | --- |
| Person Talking | Input | Output |
| A | You're a, so you're a senior now | DECLARATIVE-QUESTION |
| B | Yeah | YES-ANSWER |
| B | I'm working on my projects trying to graduate | STATEMENT |
| A | Oh, good for you | APPRECIATION |
| B | Yeah | BACKCHANNEL |

Humor & Sarcasm Detection
Input: I love being ignored
Output: SARCASM
Sentiment Analysis
Input: The ravioli just keeps getting better every time I visit.
Output: POSITIVE
Question Classification
Input: How did serfdom develop in and then leave Russia?
Output: DESC:MANNER
Input: How much would it cost to purchase a 2footsquare party tent, with sides, ?
Output: NUM:MONEY
News Headline Classification
Input: TeleCorp confirms it is buying ad platform App-Corp, reportedly for between $1.6B$2B
Output: BUSINESS
Emotion Recognition
Input: Wow I never saw that coming!
Output: SURPRISE
Intent Classification (Dialog Systems)
Input: Play levels on YouTube
Output: INTENT_PLAY_SONG_ON_DEVICE_NAME

Example Projection Sequence Networks (ProSeqoNets)

Another example projection neural network architecture provided by the present disclosure is Projection Sequence Networks (ProSeqoNets). ProSeqoNets can include one or more projection layers followed by, for example, one or more projection sequence layers. Each projection sequence layer can pass information forward and/or backward to subsequent and/or previous iterations of such layer as a sequential input is input into the network over a series of time steps. For example, each projection sequence layer can include a first set of nodes that pass information forward to subsequent iterations and/or receive information from previous iterations and also a second set of nodes that receive information passed back from subsequent iterations and/or pass information backward to previous iterations.

Figure 4:
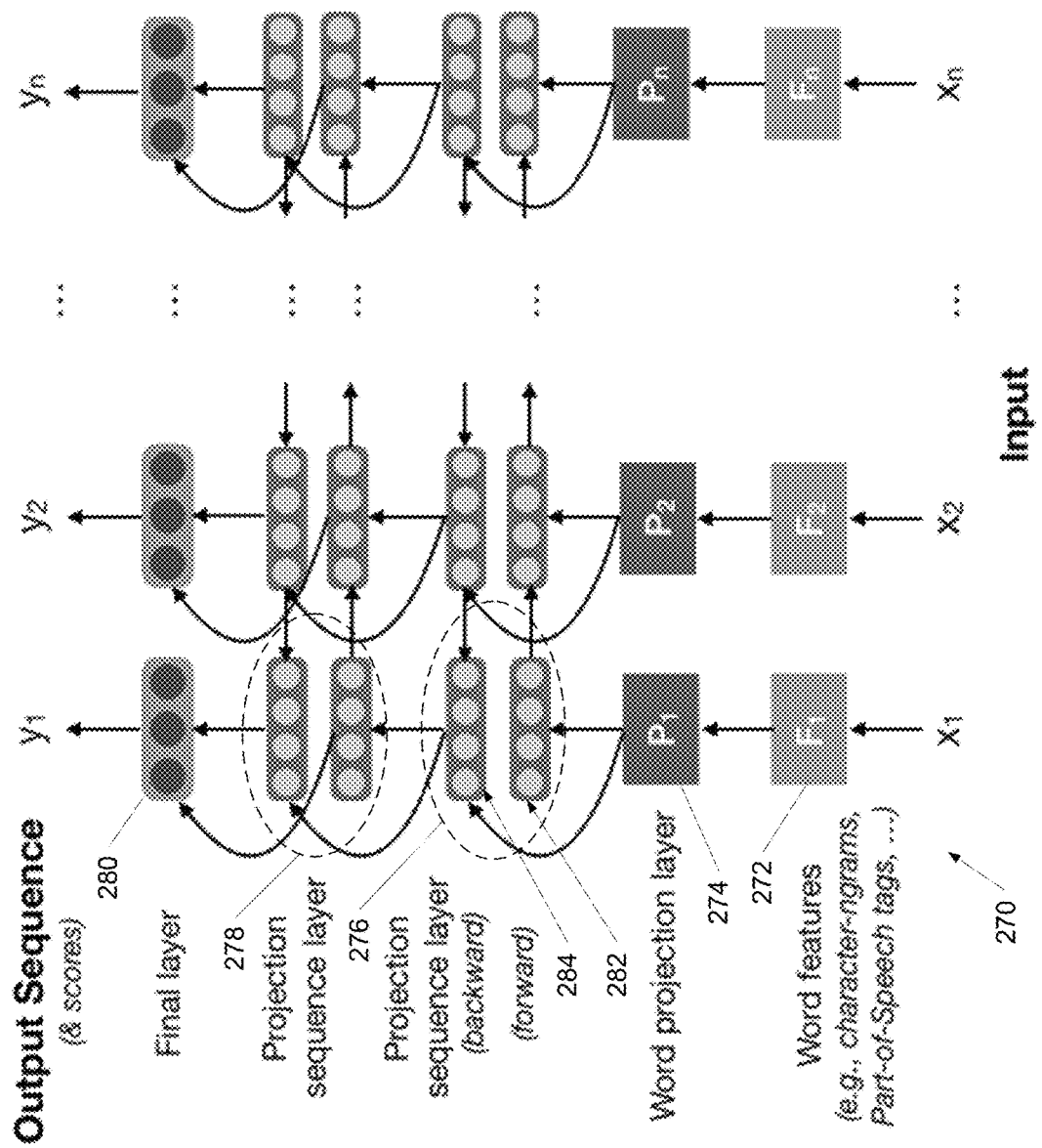
FIG. 4 depicts an example Projection Sequence Network according to example embodiments of the present disclosure.

FIG. 4 depicts an example projection sequence network 270 according to example embodiments of the present disclosure. In particular, FIG. 4 depicts n iterations of the projection sequence network 270 implemented over n times steps relative to n inputs from a sequential input source.

Thus, in some implementations, the input to projection sequence network 270 can be sequential in nature and the projection sequence network 270 can operate iteratively (e.g., at each of a plurality of time steps) to process the sequential input. As one example, as illustrated in FIG. 4, for sequential input $x_1, \ldots, x_n$, one input portion $x_i$ of the input can be input at each of a plurality of iterations. For example, at time step 2, input portion $x_i$ can be input. At each iteration, information from past time steps (e.g., the raw text and/or intermediate feature data) may or may not also be provided alongside the newly provided portion.

The projection sequence network 270 can include a feature extractor 272. The feature extractor 272 can extract an intermediate feature vector from the input. The feature extractor 272 can provide the intermediate feature vector to a projection layer 274. In some instances, the feature extractor 272 can be viewed as part of the network 270 while in other instances the feature extractor 272 is viewed as a pre-processing step for the network 270.

Thus, in some implementations, additional features can be provided as initial or intermediate input to the projection layer 274 in addition to the base input. In some implementations, these additional features can be included in one or more additional feature vectors. Thus, in some implementations, the input to the projection layer 274 can include multiple feature vectors which may expressed according to different dimensions. These feature vectors may or may not include type information that describes the type of features.

In implementations in which the input to projection layer 274 includes multiple feature vectors, input of such vectors into the network can be handled in a number of different ways. As one example, the multiple feature vectors can be concatenated and flattened to form a single input vector. In other implementations, at each time step, each feature vector can be separately input into the projection layer 274 and separately projected by the projection layer 274. After separate projection, the outputs of the projection layer 274 can be concatenated in the projected space (e.g., the bit space). In some implementations, some projection functions and/or bit space positions can be reserved and used for encoding the type information respectively associated with the feature vectors, such that the network 270 (e.g., the lowest projection sequence layer 276) can learn, in the projected space, to choose or ignore various information based on its feature type as it relates to the input or other feature types.

Thus, the projection layer 274 can project the received vector into a lower-dimensional space, for example as described with reference to FIG. 2. Following the projection layer 274, the example projection sequence network 270 includes two projection sequence layers, shown here as projection sequence layers 276 and 278. Although two projection sequence layers are shown, the network can include any number of projection sequence layer(s). Following the projection sequence layer 278 is a final layer 280. The output of the final layer 280 (e.g., over the time steps) is an output sequence (and scores).

Each projection sequence layer (e.g., 276, 278) can pass information forward and/or backward to subsequent and/or previous iterations of such layer as a sequential input is input into the network over a series of time steps. For example, each projection sequence layer can include a first set of nodes that pass information forward to subsequent iterations and/or receive information from previous iterations and also a second set of nodes that receive information passed back from subsequent iterations and/or pass information backward to previous iterations. To illustrate, projection sequence layer 276 includes a first set of nodes 282 that pass internal state information from time step 1 to themselves in the subsequent iteration of the layer 276 at time step 2. Projection sequence layer 276 includes a second set of nodes 284 that receive internal state information from time step 2 from the same nodes but in the subsequent iteration of the layer 276 at time step 2. Although not shown with the sets of nodes 282, 284, but as can be seen at the iteration of the layer 276 at the time step 2, information can be passed and received in both temporal directions by the same sets of nodes.

In some implementations, one or more (e.g., all) of the nodes included in the first set of nodes 282 and/or the second set of nodes 284 can be or include recurrent cells that have been modified for inclusion in the projection sequence layer. Example recurrent cells include LSTM cells and gated recurrent units (GRUs). In particular, in the modified recurrent cells, the projection state can be used to modify the internal state or dependencies of the cell rather than the base input features.

One example task that can be performed by ProSeqoNets is sequence labeling. In the sequence labeling task, the neural network is given text and/or intermediate features derived from text and identifies segments (e.g., sequences of words/phrases) and classifies those segments into multiple classes. Thus, in one example, the input is a text and the output is labeled sequences.

Example applications of the sequence labeling task in natural language processing include: named entity recognition; keyphrase extraction; noun phrase extraction; chunking; relation extraction; semantic parsing; slot extraction in dialog systems; product (shopping) & attribute extraction; and aspect based sentiment analysis. Additional example applications of the ProSeqoNets include translating text between languages; text completion (e.g., sentence completion and/or automatic reply); or other generative tasks. Some example tasks and applications are as follows.

Named Entity Recognition:
Input: The University of Southern California is located in Los Angeles.
Output: The [University of Southern California]_Organization is located in [Los Angeles]_Location KeyPhrase Extraction (Useful for Advertising and Content Understanding):
Input: We offer a wide variety of items including healthy dry cat food for $5.
Output: We offer a wide variety of items including [healthy dry cat food]_KeyPhrase for $5.

Noun Phrase Extraction:
Input: Huge hurricanes struck the coast of Japan.
Output: [Huge hurricanes] Noun_Phrase struck [the coast] Noun_Phrase of [Japan] Noun_Phrase Chunking:
Input: Huge hurricanes struck the coast of Japan.
Output: [Huge hurricanes]_Noun_Phrase [struck]_Verb_Phrase [[the coast]_Noun_Phrase [of]_Prep [Japan]_Noun_Phrase] Prep Noun_Phrase Relation Extraction:
Input: CorporationA was acquired by CorporationB to create synergies.
Output: [[CorporationA]_e1 was acquired by [CorporationB]_e2] _purchase(e2,e1) to create synergies.

Semantic Parsing:
Input: Remind me to set the timer to 5.
Output: [Remind]_Evoking [me]_Creator to [set]_Intentionally_Create [the timer]_Created_Entity to 5.

Slot Extraction in Dialog Systems:
Input: Reserve a flight from San Francisco to LAX for two people after 3 pm.
Output: [Reserve a flight]_Book_Flight_Intent from [San Francisco]_FromDestination:Location/Airport to [LAX]_ToDestination:Location/Airport for [two people]_Number_of_People after [3 pm]_Date_and_Time.

Product (Shopping) & Attribute Extraction:
Input: This expensive shirt ripped all the way to my shoulder, the fabric is too soft.
Output: This [expensive]_price [shirt]_product ripped all the way to my shoulder, the [fabric]_textile was too soft and runs [small]_size.

Aspect Based Sentiment Analysis:
The task is to identify every entity E and attribute A pair towards which an opinion is expressed in the given text.
Input: The flank steak was great, but the service was horrible.
Output: The [flank steak]_Sentiment:Positive was great, but the [service]_Sentiment:Negative and [ambience]_Sentiment:Negative were horrible.

Translation:
Input: I like to dance the tango.
Output: Me gusta bailar el tango.

Text Completion/Generation:
Input: A zebra has black and white
Output: stripes

Example Training Schemes

FIG. 5A is a block diagram of an example data flow by which a projection neural network system (e.g., the projection neural network system 100) can train a projection neural network (e.g., the projection neural network 102). As part of the training, the system provides a training input 302 from a set of training data 304 to the projection network 102. The projection network 102 processes the training input 302 in accordance with current values of projection network parameters to generate a projection network output 106. The system updates the current values of the projection network parameters by computing a gradient (e.g., by a backpropagation procedure) of a loss functions that depends on the projection network output 106 and a target output 310. As an example, the system can update the current values of the projection network parameters by a gradient of a loss function $\widehat{\mathcal{L}^p}$ (referred to as a projection prediction loss function) that depends on an error between the projection network output 106 and the target output 310. Updating the current values of the projection network parameters by the gradient of the projection prediction loss function $\widehat{\mathcal{L}^p}$ can cause the projection network 102 to generate an output that is more similar to the target output 310 (i.e., in response to processing the training input 302). Thus, in some implementations, the projection neural network 302 can be trained based solely on its own performance relative to the training data 304 as compared with the target output.

FIG. 5B is a block diagram of an alternative example data flow by which a projection neural network system (e.g., the projection neural network system 100) can train a projection neural network (e.g., the projection neural network 102).

As part of the training, the system provides a training input 302 from a set of training data 304 to the projection network 102. The projection network 102 processes the training input 302 in accordance with current values of projection network parameters to generate a projection network output 106. The system provides the same training input 302 to a trainer network 306. The trainer network 306 processes the training input 302 in accordance with current values of trainer network parameters to generate a trainer network output 308. The trainer network 306 can be a feed-forward neural network, a recurrent neural network, or any other appropriate type of neural network that is configured to generate the same kinds of outputs as the projection network 102 given the same training input. In general, the trainer network 306 has more parameters (in some cases, by several orders of magnitude) than the projection network 102.

The system jointly updates the current values of the projection network parameters and the trainer network parameters by computing gradients (e.g., by a backpropagation procedure) of a combination of several different loss functions. The loss functions can depend on the projection network output 106, the trainer network output 308, or both.

For example, the system can update the current values of the trainer network parameters by a gradient of a loss function $\mathcal{L}_\theta$ (referred to as a trainer prediction loss function) that depends on an error between the trainer network output 308 and the target output 310 associated with the training input 302 in the training data 304. The target output 310 is an output that should be generated by the trainer neural network 306 and the projection network 102 in response to processing the training input 302. Updating the current values of the trainer network parameters by the gradient of the trainer prediction loss function $\mathcal{L}_\theta$ can cause the trainer network 306 to generate an output that is more similar to target output 310 (i.e., in response to processing the training input 302).

As another example, the system can update the current values of the projection network parameters by a gradient of a loss function $\widehat{\mathcal{L}^p}$ (referred to as a projection prediction loss function) that depends on an error between the projection network output 106 and the target output 310. Updating the current values of the projection network parameters by the gradient of the projection prediction loss function $\widehat{\mathcal{L}^p}$ can cause the projection network 102 to generate an output that is more similar to the target output 310 (i.e., in response to processing the training input 302).

As another example, the system can also update the current values of the projection network parameters (and, optionally, the trainer network parameters) by a gradient of a loss function $\mathcal{L}^p$ (referred to as a projection simulation loss function) that depends on an error between the trainer network output 308 and the projection network output 106. Updating the current values of the projection network parameters by the gradient of the projection simulation loss function $\mathcal{L}^p$ can cause the projection network 102 to generate an output that is more similar to the trainer network output 308. By updating the values of the projection network parameters based on the projection simulation loss function $\mathcal{L}^p$, the system can (in some cases) enable the projection network 102 to generate predictions that are similar in accuracy to the predictions generated by the trainer network 306, despite the projection network 102 having far fewer parameters (e.g., in some cases, by several orders of magnitude) than the trainer network 306.

Generally, the trainer prediction loss function $\mathcal{L}_\theta$, the projection prediction loss function $\widehat{\mathcal{L}^p}$, and the projection simulation loss function $\mathcal{L}^p$ can be any appropriate loss functions. For example, if the trainer network 306 and the projection network 102 perform classification tasks, then the loss functions may be cross-entropy loss functions. As another example, if the trainer network 306 and the projection network 102 perform regression tasks, then the loss functions may be squared-error loss functions. The system may adjust the parameters of the projection network 102 and the trainer network 306 by a weighted combination of gradients of each of the described loss functions.

A graph-based system, as described earlier, that generates a projection graph as a compact representation of a trainer graph, can jointly train the projection graph, the trainer graph, and the parameters of the projection layer operations used to determine the projection graph from the trainer graph. In a particular example, the parameters of the projection layer operations can be trained (e.g., by a backpropagation procedure) to cause the predictions generated by the graph-based system based on the projection graph to become more similar to the predictions generated by the graph-based system based on the trainer graph. The similarity between predictions may be measured by a loss function, such as a cross-entropy loss function. The predictions generated by the graph-based system based on the projection graph and the trainer graph may be predicted labels for labeled or unlabeled nodes in the projection graph and trainer graph respectively.

Example Neural Projection Models

Aspects of the present disclosure are directed to a skip-gram based architecture coupled with Locality-Sensitive Hashing (LSH) projections to learn efficient dynamically computable representations. The proposed models do not need to store lookup tables as representations are computed on-the-fly and require low memory footprint. The representations can be trained in an unsupervised fashion and can be easily transferred to other NLP tasks.

Thus, example aspects are directed to a novel model (NP-SG) to learn compact neural representations that combines the benefit of representation learning approaches like skipgram model with efficient LSH projections that can be computed on-the-fly.

Example Skip Gram Model

In the skip-gram model, one learns continuous distributed representations for words in a large fixed vocabulary, V to predict the context words surrounding them in documents. This requires maintaining an embedding look up table, $v(w) \in \mathbb{R}^d$ for every word, w E V.

For each word, $w_t$ in the training corpus of size T, the set of context words $C_t = \{w_{t-w_t}, \ldots, w_{t-1}, w_{t+1}, \ldots w_{t+w_t}\}$ includes $W_t$ words to the left and right of $w_t$ respectively. $W_t$ is the window size randomly sampled from the set 1-N, where N is the maximum window size. Given a pair of words, $\{w_c, w_t\}$, the probability of $w_c$ being within the context window of $w_t$ is given by the equation below:

$$P(w_c | w_t) = \sigma(v'(w_c)^T v(w_t)) = \frac{1}{1 + \exp(-v'(w_c)^T v(w_t))}$$

where v; v' are input and context embedding look up tables.

Example Neural Projection Skip-Gram (NP-SG)

Figure 7:
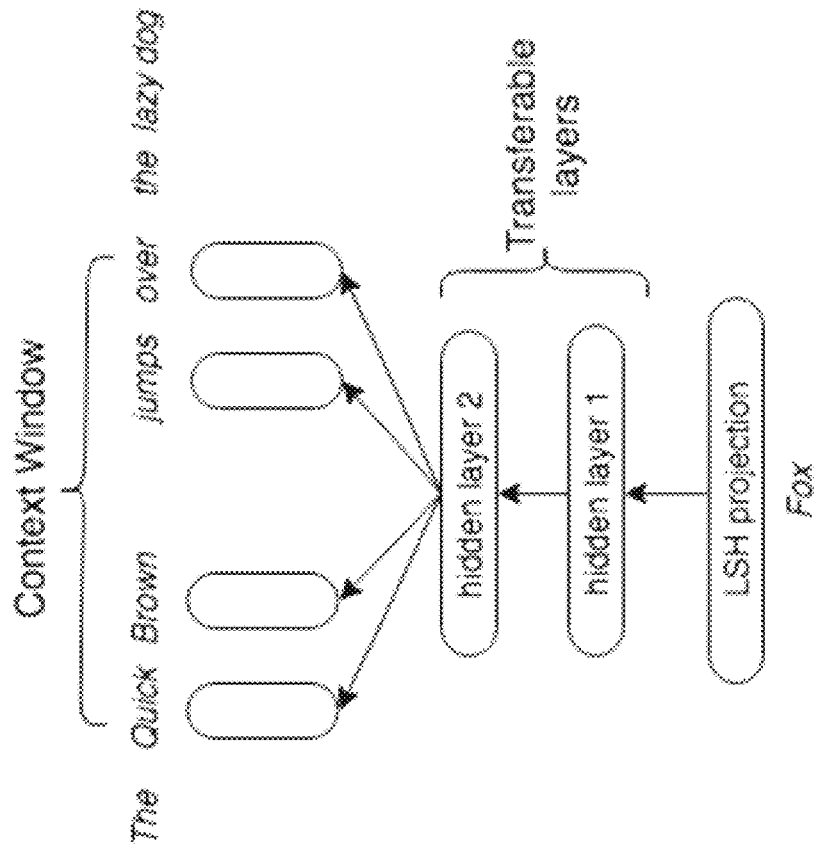
FIG. 7 depicts an example neural projection skip-gram model according to example embodiments of the present disclosure.

In the neural projection approach, the input embedding look up table, v(w) can be replaced with, as one example, a deep n-layer MLP over the binary projection, P(w) as shown in the equation below.

$$v_P(w) = \mathbb{N}(f_n(P(w)))$$

where $v_P(w) \in \mathbb{R}^d$, $f_n$ is a n-layer deep neural network encoder with ReLU non-linear activations after each layer except for the last layer as shown in FIG. 7. N refers to a normalization applied to the final layer of $f_n$. Batch-normalization, L2-normalization, or layer normalization can be used.

The binary projection P (w) can be computed using locality-sensitive projection operations (described in further detail herein) which can be performed on-the-fly (i.e., without any embedding look up) to yield a fixed, low-memory footprint binary vector. Example NP-SG models can create a trainable deep projection representation for words using LSH projections over character-level features combined with contextual information learned via the skip-gram architecture.

Example Training of NP-SG Model

IN some implementations, a similar approach as provided for the base skip gram model can be used for training the neural projection skip-gram model (NP-SG). For example, the training objective can be defined to maximize the probability of predicting the context words given the current word. Formally, the model tries to learn the word embeddings by maximizing the objective, $J(\theta)$ known as negative sampling (NEG), given by the equation below.

$$J(\theta) = \sum_{t=1}^{T} \sum_{w_c \in C_t} J_{w_t, w_c}(\theta)$$

$$J_{w_t, w_c}(\theta) = \log(P(w_c \mid w_t)) + \sum_{i=1, w_i \sim P_n(w)}^{k} \log(1 - P(w_i \mid w_t))$$

where k is the number of randomly sampled words from the training corpus according to the noise distribution, $P_n(w) \propto U(w)^{3/4}$, where U(w) is the unigram distribution of the training corpus.

Model Improvements:

Training an NP-SG model as is, though efficient, may not lead to highly discriminative representations. For example, in some situations, the word representations, $v_p(w)$ can be projected in a narrow sub-space where the cosine similarities of all the words in the dataset were too close to 1:0. This can make the convergence slower and lead to poor generalization. Therefore, care can be taken to avoid the projections having this characteristic, as is described below.

Example Discriminative NP-SG Models

To encourage the word representations to be more spaced out in terms of the cosine similarities, an additional explicit regularizing L2-loss function can be introduced. With the assumption that the words in each mini-batch are randomly sampled, an L2-loss over the cosine similarities between all the words within a mini-batch can be added, as shown in the equations below.

$$\text{Loss} = J(\theta) + L_2^{cs}(w_{mb})$$

$$L_2^{cs}(w_{mb}) = \lambda \cdot \|\{CS(w_i, w_j) \mid i, j \in [0, mb)\}\|_2^2$$

where CS(w_i,w_j) refers to the cosine similarity between w_i and w_j, mb refers to the mini-batch size and w_mb refers to the words in the mini-batch.

In some implementations, this can be enforced using a simple outer-product trick. The cosine-similarities between all the words within a mini-batch can be extracted in a single shot by computing the outer-product of the L2 row normalized word representations corresponding to each minibatch $\hat{v}\_P(w\_mb)$, as shown in the following equation:

$$L_2^{cs}(w_{mb}) = \frac{\lambda}{2} \cdot \|\text{Flatten}(\hat{v}_P(w_{mb}) \cdot \hat{v}_P(w_{mb})^T)\|_2^2$$

Example Improved NP-SG Training

Since the NP-SG model does not have a fixed vocabulary size, applications of the model can be flexible and leverage a lot more information during training compared to standard skip-gram models which require vocabulary pruning for feasibility.

To improve training for NP-SG model, the dataset can be augmented with inputs words after applying character level perturbations to them. The perturbations are such a way that they are commonly occurring misspellings in documents. Example types of perturbation operation that can be performed are as follows:

insert(word, n): Randomly choose n chars from the character vocabulary and insert them randomly into the input word. Ignore the locations of first and last character in the word for the insert operation. Example transformation: sample>samnple.

swap(word, n): Randomly swap the location of two characters in the word n times. As with the insert operation, ignore the first and last character in the word for the swap operation. Example transformation: sample>sapmle.

duplicate(word, n): Randomly duplicate a character in the word by n times. Example transformation: sample>saample.

drop(sentence, n): Randomly drop n words from the sentence. Example transformation: This is a sample sentence>This is a sentence.

duplicate(sentence, n): Similar to duplicate(word, n) above, we randomly duplicate a word in the sentence n times. Example transformation: This is a sample sentence>This is a sample sample sentence.

swap(sentence, n): Similar to swap(word, n), randomly swap the location of two words in the sentence n times. Example transformation: This is a sample sentence>This sample a is sentence.

The example perturbation operations listed above are not exhaustive.

Example Training Setup

One example training setup is as follows: Train skipgram models on the wikipedia data XML dump, enwik91. Extract the normalized English text from the XML dump using the Matt Mahoneys pre-processing perl script2. Fix the vocabulary to the top 100 k frequently occurring words. Sub-sample words in the training corpus, dropping them with some probability based on their frequency of occurrence in the corpus. Perturb the input words with some probability.

One example implementation is as follows. The following values are implementation details which can be modified to achieve different objectives: Fix the number of random projections to 80 and the projection dimension to 14. Use a 2-layer MLP (sizes: [2048; 100]) regularized with dropout (with probability of 0:65) and weight decay (regularization parameter of 0:0005) to transform the binary random projections to continuous word representation. For the vanilla skipgram model, fix the embedding size to 100. For both models, use 25 negative samples for the NEG loss. Learn the parameters using the Adam optimizer with a default learning rate of 0:001, clipping the gradients which have a norm larger than 5:0. Initialize the weights of the MLP using Xavier initialization, and output embeddings uniformly random in the range [−1.0; 1.0]. Use a batch size of 1024. Use lambda=0.01 for the outerproduct loss.

Example Trainable Projection Auto-Encoder

Another example aspect of the present disclosure is directed to a novel autoencoder projections model that can be trained on an unsupervised text.

Example Model Architecture

This section describes a trainable and plug-able version of LSH projection representation. Unlike certain other example implementations that train neural models with static projections in strictly supervised settings, a key advantage of this model is that it can be pre-trained in an unsupervised fashion on a large corpus to obtain better text representations.

Figure 8:
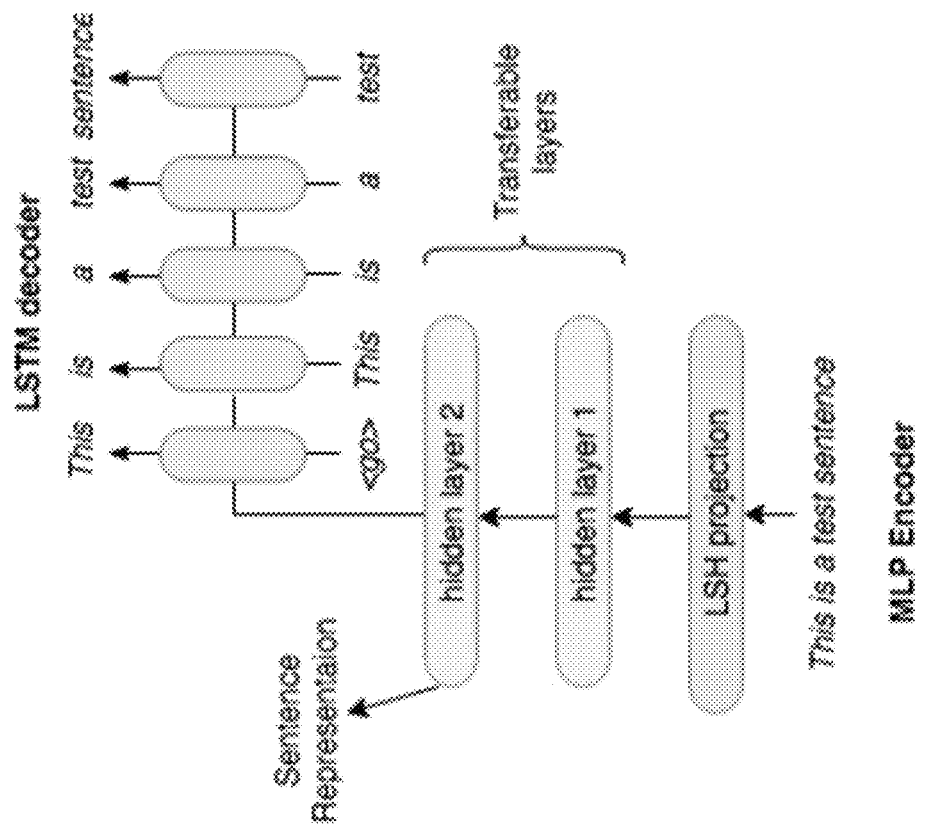
FIG. 8 depicts an example neural projection auto-encoder architecture according to example embodiments of the present disclosure.

A projection auto-encoder architecture is proposed as shown in FIG. 8 that (1) learns better text representations from unsupervised text, and (2) can be plugged in and used to initialize input representations for models in other supervised NLP tasks.

Figure 9:
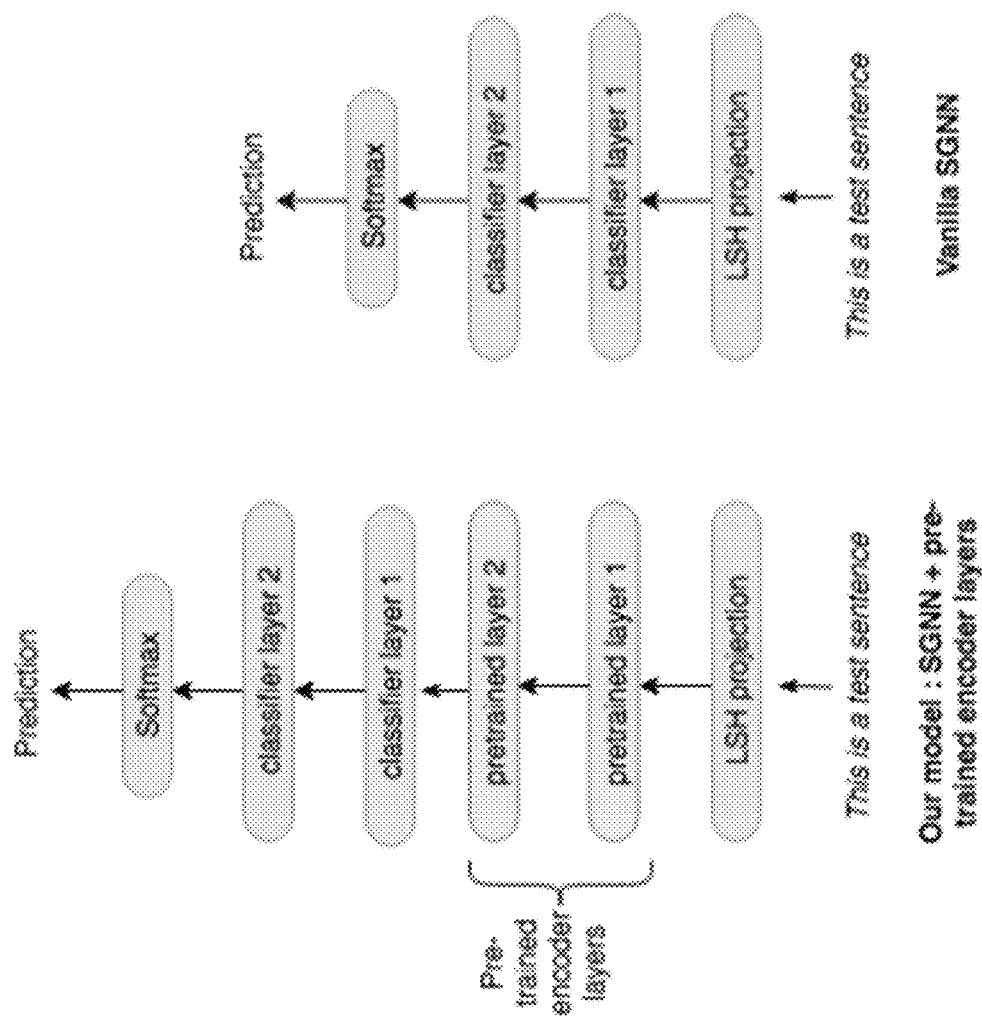
FIG. 9 depicts learning a classifier model with pre-trained neural projections according to example embodiments of the present disclosure.

Encoder:

One example architecture uses a deep projection encoder, modeled via a deep MLP on top of the LSH projections. All the layers have the ReLU non-linearity activation except for the final layer. The final layer is a full connected layer without any non-linearities. The final layer of the encoder, E(P(w)) acts as a sentence representation which can be plugged in as the input representation in other models as shown in FIG. 9.

Decoder:

Next, in some implementations, the deep projection encoder can be combined with a decoder, an LSTM model, that predicts the tokens present in the sentences conditioned on the final layer of the encoder.

Let w={w_1, w_2, ..., w_N} be the sequence of the words in the text for which we want to learn representations. The purpose the decoder is to maximize the probability of reconstructing the input ŵ={ŵ_1, ŵ_2, ..., ŵ_N}, token by token, given its LSH projection.

The conditional probability of the decoder LSTM at time step=n is given by the equation below $$p(\hat{w}_n | \hat{w}_1, \hat{w}_2, \ldots, \hat{w}_{n-1}, E(\mathbb{P}(w))) = \text{Softmax}(g(\hat{w}_{n-1}, s_n, E(\mathbb{P}(w))))$$

where s_n and g denote the hidden state of the decoder at time n, and a non-linear function, respectively.

Example Training Setup

One example training setup is as follows: Train the projection auto-encoder by learning to reconstruct sentences from the enwik9 dataset. Restrict the vocabulary to top 30000 frequently occurring words and a max sentence length of 20.

Fix the number of random LSH projections to 80 and the projection dimension to 14. For the encoder, consider 2-layer deep MLP with size: [256; 256]. Add batch normalization layer on top of the final encoder layer before feeding it to the decoder. The decoder can be a single layer LSTM with hidden size, 256.

Use the Adam optimizer with a default learning rate of 0.001, clipping the gradients which have a norm larger than 5.0.

Example Classification with Projection Auto-Encoder

Once trained, we fix and extract just the pre-trained projection encoder from the neural projection autoencoder model shown in FIG. 8. For supervised language classification tasks, we plug the pre-trained projection encoder into an existing classifier model and then train just the classifier layers of the network on the labeled data for the specific task. In contrast, a vanilla projection model (e.g., SGNN) directly plugs in static LSH projection outputs into a classifier. FIG. 9 illustrates this. For classification, the final layer of the neural network can apply Softmax to generate a probability distribution over output classes. The classifier models can be trained to minimize negative log-likelihood over correct classes in the training data.

Example Devices and Systems

Figure 6A:
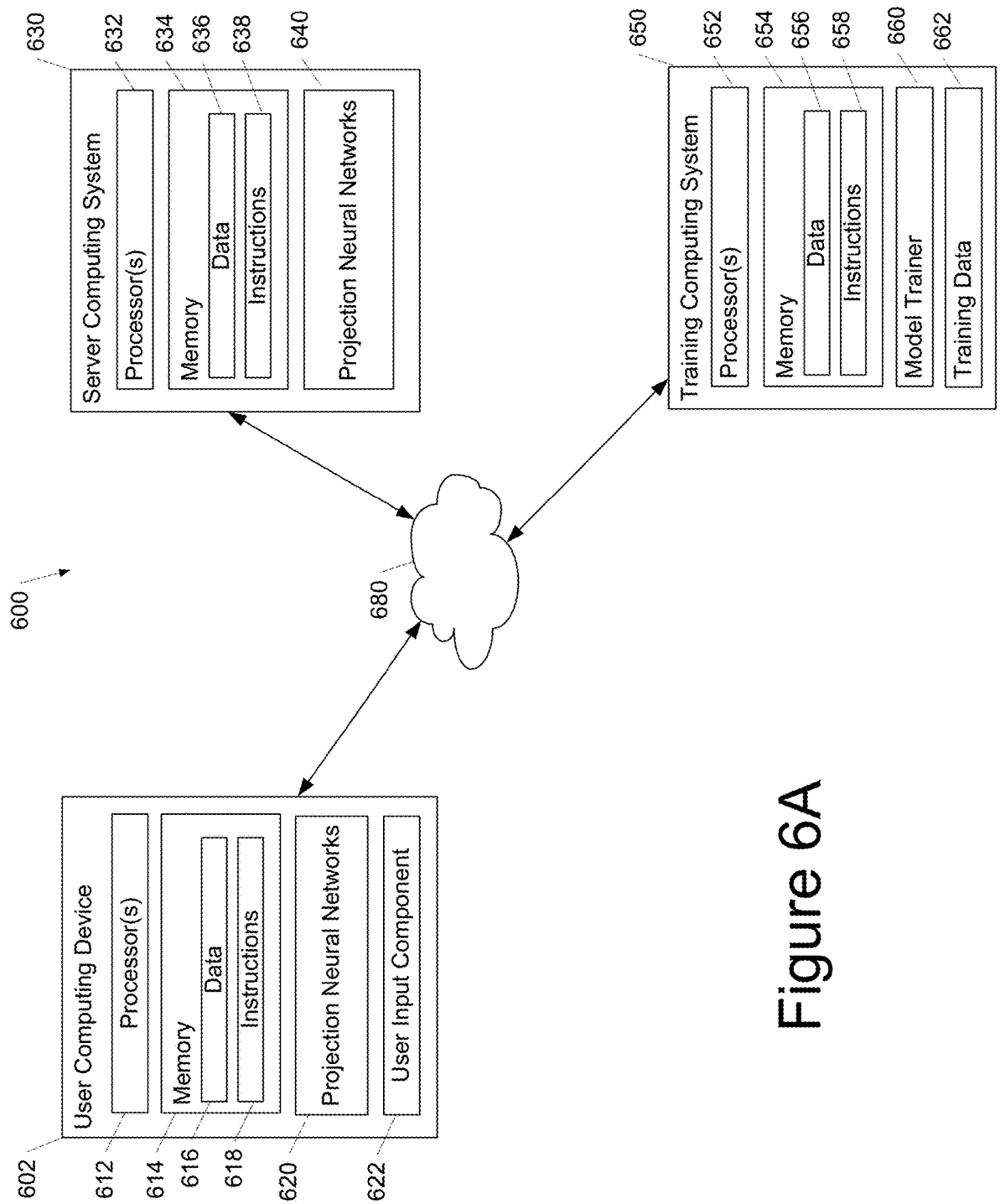
FIGS. 6A-C depict block diagrams of example computing systems and devices according to example embodiments of the present disclosure.

FIG. 6A depicts a block diagram of an example computing system 600 according to example embodiments of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, a FPGA, a controller, a microcontroller, etc.) and can be one processor or a plurality of processors that are operatively connected. The memory 614 can include one or more non-transitory computer-readable storage mediums, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more projection neural networks 620. For example, the projection neural networks 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more projection neural networks 620 can be received from the server computing system 630 over network 680, stored in the user computing device memory 614, and then used or otherwise implemented by the one or more processors 612. In some implementations, the user computing device 602 can implement multiple parallel instances of a single projection neural network 620.

Additionally or alternatively, one or more projection neural networks 640 can be included in or otherwise stored and implemented by the server computing system 630 that communicates with the user computing device 602 according to a client-server relationship. For example, the projection neural networks 640 can be implemented by the server computing system 640 as a portion of a web service. Thus, one or more projection neural networks 620 can be stored and implemented at the user computing device 602 and/or one or more projection neural networks 640 can be stored and implemented at the server computing system 630.

The user computing device 602 can also include one or more user input component 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage mediums, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned projection neural networks 640. For example, the projection neural networks 640 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 602 and/or the server computing system 630 can train the projection neural networks 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, a FPGA, a controller, a microcontroller, etc.) and can be one processor or a plurality of processors that are operatively connected. The memory 654 can include one or more non-transitory computer-readable storage mediums, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned projection neural networks 620 and/or 640 stored at the user computing device 602 and/or the server computing system 630 using various training or learning techniques, such as, for example, backwards propagation of errors. In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the projection neural networks 620 and/or 640 based on a set of training data 662. The training data 662 can include, for example, textual input that has been labeled with target outputs or otherwise has target outputs associated therewith. In some implementations, the target outputs can be text classifications and/or segment classifications.

In some implementations, if the user has provided consent, the training examples can be provided by the user computing device 602. Thus, in such implementations, the projection neural network 620 provided to the user computing device 602 can be trained by the training computing system 650 on user-specific data received from the user computing device 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM hard disk or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 602 can include the model trainer 660 and the training dataset 662. In such implementations, the projection neural networks 620 can be both trained and used locally at the user computing device 602. In some of such implementations, the user computing device 602 can implement the model trainer 660 to personalize the projection neural networks 620 based on user-specific data.

Figure 6B:
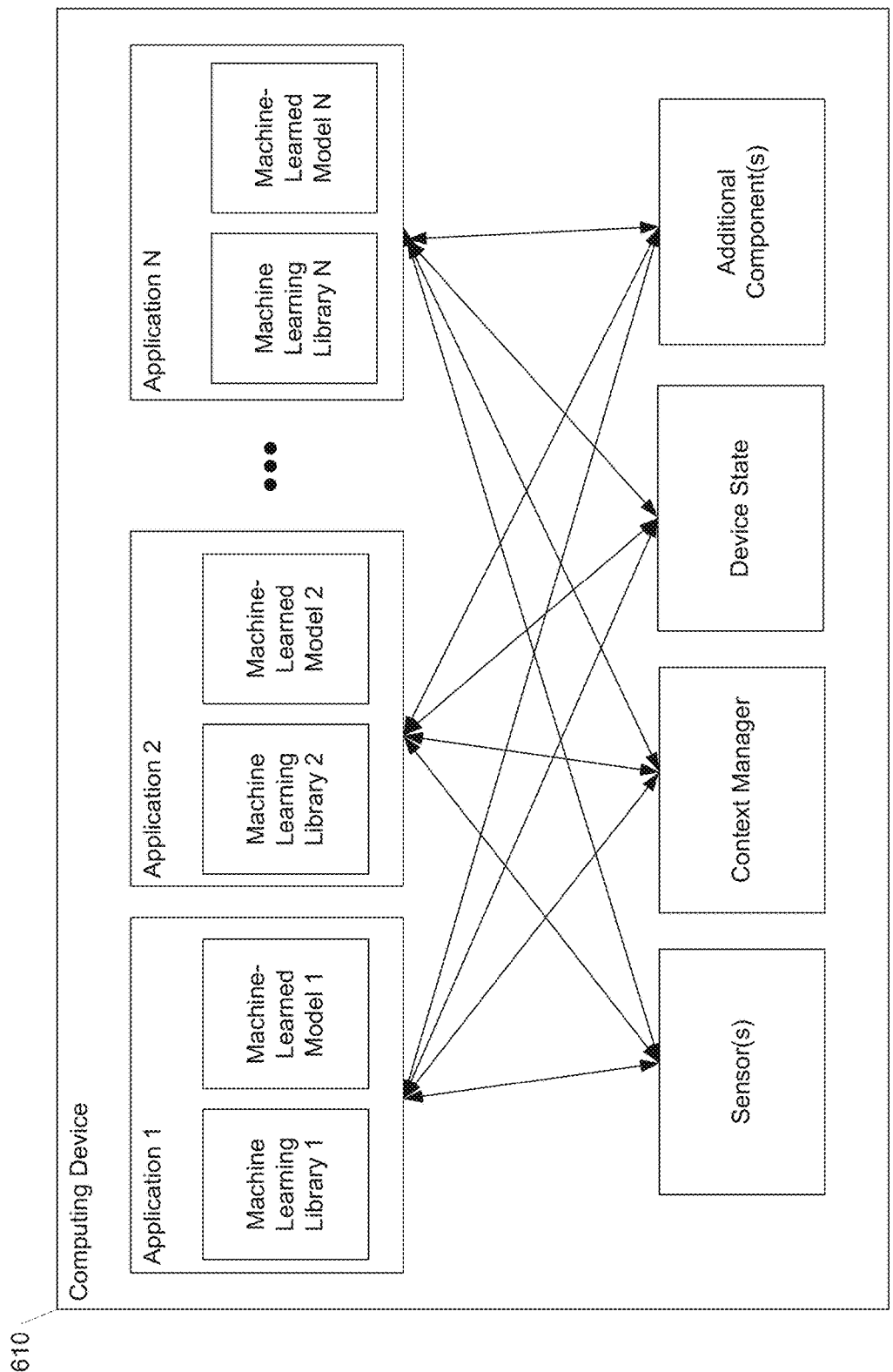

FIG. 6B depicts a block diagram of an example computing device 60 according to example embodiments of the present disclosure. The computing device 60 can be a user computing device or a server computing device.

The computing device 60 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
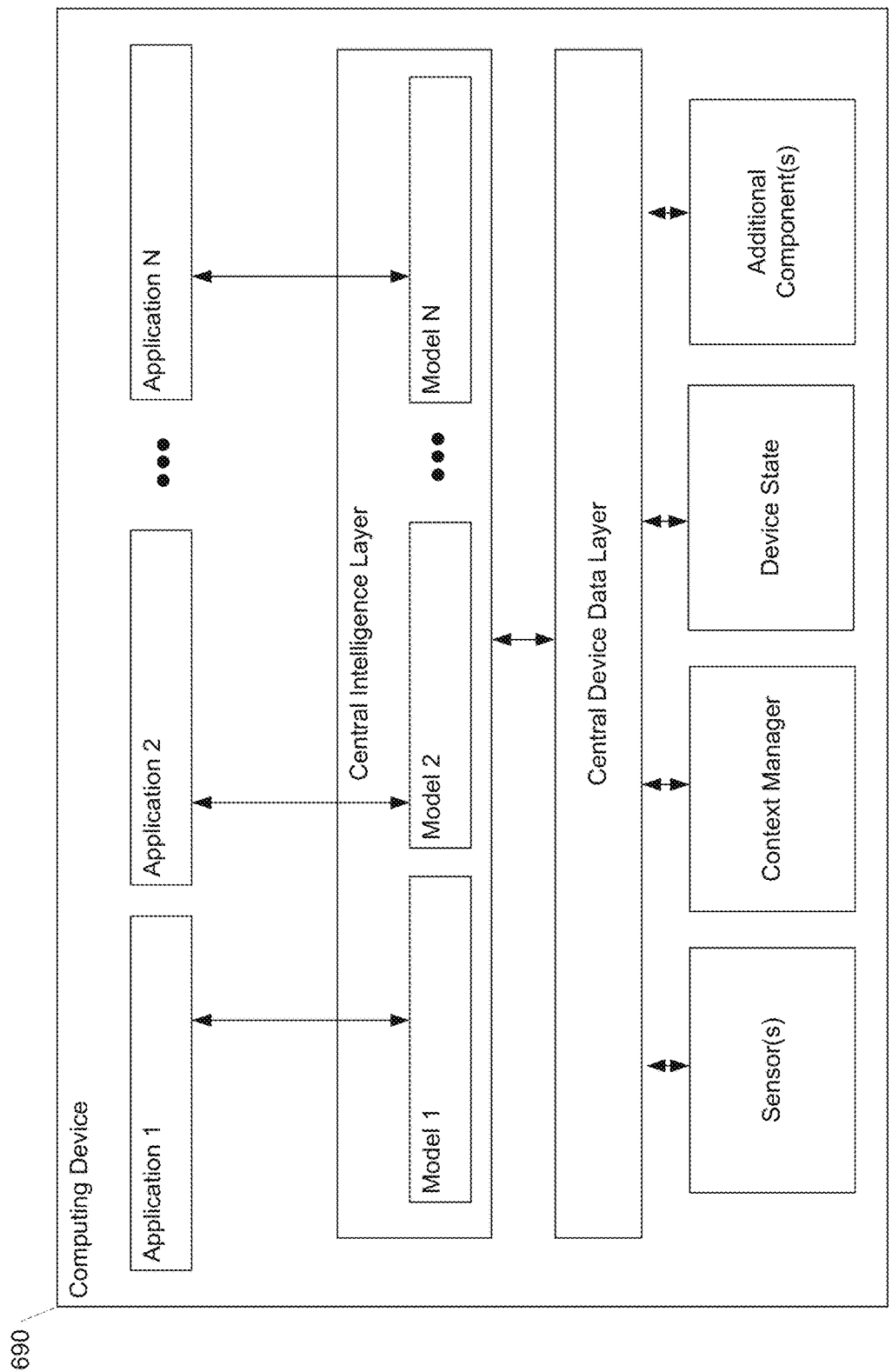

FIG. 6C depicts a block diagram of an example computing device 690 according to example embodiments of the present disclosure. The computing device 690 can be a user computing device or a server computing device.

The computing device 690 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 690.

The central intelligence layer can communicate with a central device data layer. The central device data layer can be a centralized repository of data for the computing device 690. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Projection Networks and Systems

This specification describes a projection neural network implemented as computer programs on one or more computers in one or more locations.

According to an aspect there is provided a system including one or more computers and one or more storage devices storing instructions that when executed by the one or more computers cause the one or more computers to implement a projection neural network. The projection neural network is configured to receive a projection network input and to generate a projection network output from the projection network input. The projection neural network includes a sequence of one or more projection layers, wherein each projection layer has multiple projection layer parameters. Each projection layer is configured to receive a layer input and apply multiple projection layer functions to the layer input. Each projection layer function generates a respective projection function output that projects the layer input to a different space. Each projection layer generates a layer output by applying the projection layer parameters for the projection layer to the projection function outputs.

In some implementations, the projection neural network further includes an output layer configured to receive a layer output generated by a highest projection layer in the sequence and to generate the projection network output.

In some implementations, the output layer is a softmax output layer.

In some implementations, the projection neural network includes only the sequence of projection layers and the output layer.

In some implementations, a layer output of the highest projection layer in the sequence is the projection network output.

In some implementations, the projection neural network includes only the sequence of projection layers.

In some implementations, the layer input of a lowest projection layer in the sequence is a network input to the projection neural network.

In some implementations, the layer input of any projection layer other than the lowest projection layer is a layer output generated by the projection layer immediately below the projection layer in the sequence.

In some implementations, for each projection layer, each projection function is associated with a respective set of projection vectors. Applying each projection function to the layer input includes, for each projection vector: (i) determining a dot product between the layer input and the projection vector, (ii) when the dot product is negative, assigning a first value to a corresponding position in the projection function output, and (iii) when the dot product is positive, assigning a second value to the corresponding position in the projection function output.

In some implementations, for each projection layer, the projection functions are each encoded as sparse matrices and are used to generate a binary representation from the layer input.

In some implementations, the projection layer parameters include a parameter matrix and a bias vector. Generating the layer output by applying the projection layer parameters for the projection layer to the projection function outputs includes applying the parameter matrix to the projection function outputs and then adding the bias vector to the result.

According to another aspect there is provided a method of training the projection neural network. The method includes receiving a training input and a target output for the training input. The training input is processed using the projection neural network in accordance with current values of the projection layer parameters to generate a projection network output for the training input. The training input is processed using a trainer neural network having multiple trainer neural network parameters. The trainer neural network is configured to process the training input in accordance with current values of the trainer neural network parameters to generate a trainer network output that is specific to the particular machine learning task. A gradient is determined with respect to the trainer neural network parameters of a loss function that depends on an error between the target output and the trainer network output. A gradient is determined with respect to the projection layer parameters of a loss function that depends on an error between the trainer network output and the projection network output. Updates to the current values of the trainer network parameters and the projection layer parameters are determined using the gradients.

In some implementations, the output generated by the trainer neural network is a soft target output.

In some implementations, the method further includes determining a gradient with respect to the trainer network parameters of the loss function that depends on the error between the trainer network output and the projection network output. The update to the current values of the trainer network parameters is also based on the gradient with respect to the trainer network parameters of the loss function that depends on the error between the trainer network output and the projection network output.

In some implementations, the method further includes determining a gradient with respect to the projection layer parameters of a loss function that depends on an error between the target output and the projection network output. The update to the current values of the projection layer parameters is also based on the gradient with respect to the projection layer parameters of the loss function that depends on the error between the target output and the projection network output.

According to another aspect there is provided a system including one or more computers and one or more storage devices storing instructions that when executed by the one or more computers cause the one or more computers to perform the operations of the previously described method.

According to another aspect there is provided one or more computer storage media storing instructions that when executed by one or more computers cause the one or more computers to perform the operations of the previously described method.

According to another aspect there is provided one or more computer storage media storing instructions that when executed by one or more computers cause the one or more computers to implement the previously described projection neural network.

Particular embodiments of the subject matter described in this specification can be implemented so as to realize one or more of the following advantages.

A projection network as described in this specification can perform tasks faster and with a performance level (e.g., a prediction accuracy) that is similar to that of much larger and more complex conventional neural networks (i.e., neural networks that do not contain projection layers, as described in this specification), while consuming fewer computational resources (e.g., memory and computing power). For example, in some cases, a projection network can perform tasks (e.g., image classification) with a performance level comparable to that of a larger neural network, despite the projection network having several orders of magnitude fewer parameters than the larger neural network. Projection networks can perform tasks faster and consume fewer computational resources than conventional neural networks because they include projection layers.

A projection layer reduces the dimensionality of a projection layer input by processing the projection layer input by projection layer functions. The projection layer functions generate projection function outputs that have a dimensionality that may be several orders of magnitude smaller than the dimensionality of the projection layer input. The projection layer generates a projection layer output by applying projection layer parameters (e.g., a weight matrix and a bias vector) to the low-dimensional projection function outputs. In contrast, a conventional neural network layer (e.g., a conventional fully-connected layer) may directly process a (high-dimensional) conventional layer input without first reducing the dimensionality of the conventional layer input. Since projection layers reduce the dimensionality of layer inputs by projection functions, projection layers may require far fewer layer parameters and may perform far fewer arithmetic operations in generating layer outputs than some conventional neural network layers.

Therefore, projection layers can reduce computational resource consumption (e.g., relative to conventional neural network layers) by performing fewer arithmetic operations and therefore consuming less computing power. Moreover, projection layers can reduce computational resource consumption since they can be stored (e.g., in a logical data storage area or physical data storage device) using less memory (e.g., as measured in bytes).

Consequently, projection networks may be suitable for deployment in resource-constrained systems, such as mobile device environments (e.g., smartphones and smartwatches), where some conventional neural networks cannot be deployed (e.g., because their computational resource demands exceed the computational resources available). Moreover, deploying projection networks to resource constrained systems enables these systems to increase data privacy by performing tasks locally instead of remotely. Performing a task locally refers to performing the task using computational resources located within the system, whereas performing a task remotely refers to transmitting data characterizing the task to a remote environment (e.g., a cloud environment) over a communications network (e.g., the Internet), and receiving the results of the completed task back over the communications network. Performing tasks locally can increase data privacy since it does not require transmitting data over communications networks.

A projection network can be trained to achieve a performance level (e.g., prediction accuracy) comparable to that of a much larger neural network by jointly training the projection network and a trainer network. A trainer network is a network that is configured to perform the same task as the projection network, but which is generally much larger (i.e., has more parameters) than the projection network. The values of the projection network parameters may be iteratively updated during training using a gradient of a loss function that depends on an error between the trainer network output and the projection network output. In this manner, the projection network can learn to mimic the predictions of the trainer network and thereby generate predictions that are nearly as accurate as those of the trainer network, despite the projection network having far fewer parameters than the trainer network.

Additional example aspects are directed to a computing system, comprising: one or more processors; and one or more non-transitory computer-readable media that collectively store: a pre-trained projection network configured to receive a language input comprising one or more units of text and to dynamically generate an intermediate representation from the language input, the projection network comprising: a sequence of one or more projection layers, wherein each projection layer is configured to receive a layer input and apply a plurality of projection layer functions to the layer input to generate a projection layer output; and a sequence of one or more intermediate layers configured to receive the projection layer output generated by a last projection layer in the sequence of one or more projection layers and to generate one or more intermediate layer outputs, wherein the intermediate representation comprises the intermediate layer output generated by a last intermediate layer in the sequence of one or more intermediate layers; instructions that, when executed by the one or more processors, cause the computing system to perform operations, the operations comprising: obtaining the language input; inputting the language input into the pre-trained projection network; and receiving the intermediate representation as an output of the pre-trained projection network.

In some implementations, the one or more non-transitory computer-readable media further collectively store a machine-learned prediction model configured to receive the intermediate representation and to generate a prediction from the intermediate representation; and the operations further comprise: inputting the intermediate representation into the machine-learned prediction model; and receiving the prediction as an output of the machine-learned prediction model.

In some implementations, the pre-trained projection network was previously trained as part of an autoencoder model, the autoencoder model comprising: the pre-trained projection network configured to receive the language input and to generate the intermediate representation; and a decoder model configured to receive the intermediate representation and to generate a reconstructed language input based on the intermediate representation.

In some implementations, the decoder model comprises a recurrent neural network.

In some implementations, the language input comprises data descriptive of a sentence; the intermediate representation comprises a sentence representation; and the decoder model is configured to generate a reconstructed sentence.

In some implementations, the autoencoder model is trained to maximize a probability of the reconstructed language input matching the language input on a token-by-token basis.

In some implementations, the pre-trained projection network was previously trained as a projection skip-gram model configured to receive an input word and to predict a plurality of context words surrounding the input word.

In some implementations, the projection skip-gram model was trained using a negative sampling objective function.

In some implementations, the projection skip-gram model was trained using an objective function that includes a regularization term that provides a penalty that has a magnitude that is positively correlated with a sum of a cosine similarity between the respective intermediate representations produced by the projection network for each pair of words in a training batch.

In some implementations, the projection skip-gram model was trained on a training dataset that comprises a plurality of training examples, and wherein one or more perturbation functions were applied to one or more of the plurality of training examples during training of the projection skip-gram model.

In some implementations, each of the intermediate layers other than the last intermediate layer comprises one or more non-linear activations; and the last intermediate layer comprises a fully connected layer without non-linear activations.

In some implementations, the projection network was previously trained using an unsupervised learning technique; and at least the machine-learned prediction model was trained using a supervised learning technique.

In some implementations, the projection network was previously trained using a first set of training data comprising a first plurality of training examples; and at least the machine-learned prediction model was trained using a second, different set of training data comprising a second plurality of training examples.

In some implementations, the machine-learned prediction model was trained using the second, different set of training data through performance of training operations comprising: inputting each of the second plurality of training examples into the projection network; receiving a respective intermediate representation for each of the second plurality of training examples as an output of the projection network; inputting each respective intermediate representation into the machine-learned prediction model; receiving a respective prediction for each of the second plurality of training examples as an output of the machine-learned prediction model; and backpropagating, through at least the machine-learned prediction model, an objective function that compares to the respective prediction for each of the second plurality of training examples to a respective ground truth associated with such training example.

In some implementations, the projection network was further refined using the second, different set of training data through further backpropagation of the objective function through the sequence of one or more intermediate layers subsequent to backpropagation of the objective function through the machine-learned prediction model.

In some implementations, the language input: consists of a single word; or comprises a string of a plurality of words.

In some implementations, the projection network further comprises a feature extraction layer configured to receive the language input and generate a feature vector that comprises features extracted from the language input, wherein the layer input for a first projection layer of the one or more projection layers comprises the feature vector, and wherein the features extracted from the language input comprise one or more of the following: skip-grams; n-grams; part of speech tags; dependency relationships; knowledge graph information; or contextual information.

In some implementations, for each projection layer, the plurality of projection layer functions are precomputed and held static.

In some implementations, for each projection layer, the plurality of projection layer functions are modeled using locality sensitive hashing.

In some implementations, the operations further comprise: dynamically computing the plurality of projection layer functions at inference time using one or more seeds.

In some implementations, the projection neural network performs natural language processing without initializing, loading, or storing any feature or vocabulary weight matrices.

In some implementations, for each projection layer, each projection function is associated with a respective set of projection vectors, and wherein applying each projection function to the layer input comprises: for each projection vector: determining a dot product between the layer input and the projection vector; when the dot product is negative, assigning a first value to a corresponding position in the projection function output; and when the dot product is positive, assigning a second value to the corresponding position in the projection function output.

In some implementations, for each projection layer, the projection functions are each encoded as sparse matrices and are used to generate a binary representation from the layer input.

In some implementations, the intermediate representation comprises a numerical feature vector.

Another example aspect is directed to computer-implemented method to pre-train a projection network comprising one or more projection layers and one or more intermediate layers, each projection layer configured to apply one or more projection functions to project a layer input into a different dimensional space, the projection network configured to receive an input and to generate an intermediate representation for the input, the method comprising: accessing, by one or more computing devices, a set of training data comprising a plurality of example inputs; inputting, by the one or more computing devices, each of the plurality of example inputs into the projection network; receiving, by the one or more computing devices, a respective intermediate representation for each of the plurality of example inputs as an output of the projection network; inputting, by the one or more computing devices, each respective intermediate representation into a decoder model configured to reconstruct inputs based on intermediate representations; receiving, by the one or more computing devices, a respective reconstructed input for each of the plurality of example inputs as an output of the decoder model; and learning, by the one or more computing devices, one or more parameter values for the one or more intermediate layers of the projection network based at least in part on a comparison of each respective reconstructed input to the corresponding example input.

In some implementations, the decoder model comprises a recurrent neural network.

In some implementations, each example input comprises data descriptive of a respective sentence; the respective intermediate representation for each example input comprises a respective sentence representation of the respective sentence; and the respective reconstructed input for each of the plurality of example inputs comprises a respective reconstructed sentence for the respective sentence.

In some implementations, learning, by the one or more computing devices, the one or more parameter values for the one or more intermediate layers of the projection network based at least in part on the comparison of each respective reconstructed input to the corresponding example input comprises jointly training, by the one or more computing devices, the projection network and the decoder to maximize a probability of each respective reconstructed input matching the corresponding example input on a token-by-token basis.

In some implementations, further comprising, after learning the one or more parameter values: providing, by the one or more computing devices, the projection network for use as a transferable natural language representation generator.

Another example aspect is directed to a computer-implemented method to pre-train a projection network comprising one or more projection layers and one or more intermediate layers, each projection layer configured to apply one or more projection functions to project a layer input into a different dimensional space, the projection network configured to receive an input and to generate an intermediate representation for the input, the method comprising: accessing, by one or more computing devices, a set of training data comprising a plurality of input words, wherein a respective set of ground truth context words are associated with each of the plurality of input words; inputting, by the one or more computing devices, each of the plurality of input words into the projection network; receiving, by the one or more computing devices, a respective intermediate representation for each of the plurality of input words as an output of the projection network; determining, by the one or more computing devices, a set of predicted context words for each of the plurality of input words based at least in part on the respective intermediate representation for each of the plurality of input words; and learning, by the one or more computing devices, one or more parameter values for the one or more intermediate layers of the projection network based at least in part on a comparison, for each input word, of the respective set of predicted context words to the respective set of ground truth context words.

In some implementations, learning, by the one or more computing devices, the one or more parameter values comprises optimizing, by the one or more computing devices, a negative sampling objective function.

In some implementations, learning, by the one or more computing devices, the one or more parameter values comprises optimizing, by the one or more computing devices, an objective function that includes a regularization term that provides a penalty that has a magnitude that is positively correlated with a sum of a cosine similarity between the respective intermediate representation produced by the projection network for each pair of words in the set of training data.

In some implementations, further comprising, prior to inputting the input words into the projection network: applying, by the one or more computing devices, one or more perturbation functions to one or more of the plurality of input words during learning of the one or more parameter values.

In some implementations, further comprising, after learning the one or more parameter values: providing, by the one or more computing devices, the projection network for use as a transferable natural language representation generator.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more processors; and
one or more non-transitory computer-readable media that collectively store:
a pre-trained projection neural network configured to receive a language input comprising one or more units of text and to dynamically generate an intermediate representation from the language input, the projection neural network comprising:
a sequence of one or more projection layers, wherein each projection layer is configured to receive a layer input and apply a plurality of projection layer functions to the layer input to generate a projection layer output; and a sequence of one or more intermediate layers configured to receive the projection layer output generated by a last projection layer in the sequence of one or more projection layers and to generate one or more intermediate layer outputs, wherein the intermediate representation comprises the intermediate layer output generated by a last intermediate layer in the sequence of one or more intermediate layers;

instructions that, when executed by the one or more processors, cause the computing system to perform operations, the operations comprising:

obtaining the language input;

inputting the language input into the pre-trained projection neural network; and receiving the intermediate representation as an output of the pre-trained projection neural network.

2. The computing system of claim 1, wherein:

the one or more non-transitory computer-readable media further collectively store a machine-learned prediction model configured to receive the intermediate representation and to generate a prediction from the intermediate representation; and the operations further comprise:

inputting the intermediate representation into the machine-learned prediction model; and receiving the prediction as an output of the machine-learned prediction model.

3. The computing system of claim 1, wherein the pre-trained projection neural network was previously trained as part of an autoencoder model, the autoencoder model comprising:

the pre-trained projection neural network configured to receive the language input and to generate the intermediate representation; and a decoder model configured to receive the intermediate representation and to generate a reconstructed language input based on the intermediate representation.

4. The computing system of claim 3, wherein the autoencoder model is trained to maximize a probability of the reconstructed language input matching the language input on a token-by-token basis.

5. The computing system of claim 1, wherein the pre-trained projection neural network was previously trained as a projection skip-gram model configured to receive an input word and to predict a plurality of context words surrounding the input word.

6. The computing system of claim 5, wherein the projection skip-gram model was trained using an objective function that includes a regularization term that provides a penalty that has a magnitude that is positively correlated with a sum of a cosine similarity between the respective intermediate representations produced by the projection neural network for each pair of words in a training batch.

7. The computing system of claim 2, wherein one or both:

(1) the projection neural network was previously trained using an unsupervised learning technique and at least the machine-learned prediction model was trained using a supervised learning technique; or (2) the projection neural network was previously trained using a first set of training data comprising a first plurality of training examples and at least the machine-learned prediction model was trained using a second, different set of training data comprising a second plurality of training examples.

8. The computing system of claim 1, wherein the projection neural network further comprises a feature extraction layer configured to receive the language input and generate a feature vector that comprises features extracted from the language input, wherein the layer input for a first projection layer of the one or more projection layers comprises the feature vector, and wherein the features extracted from the language input comprise one or more of the following: skip-grams; n-grams; part of speech tags; dependency relationships; knowledge graph information; or contextual information.

9. The computing system of claim 1, wherein, for each projection layer, the plurality of projection layer functions are precomputed and held static.

10. The computing system of claim 1, wherein, for each projection layer, the plurality of projection layer functions are modeled using locality sensitive hashing.

11. The computing system of claim 1, the operations further comprise:

dynamically computing the plurality of projection layer functions at inference time using one or more seeds.

12. The computing system of claim 1, wherein the projection neural network performs natural language processing without initializing, loading, or storing any feature or vocabulary weight matrices.

13. The computing system of claim 1, wherein, for each projection layer, each projection function is associated with a respective set of projection vectors, and wherein applying each projection function to the layer input comprises:

for each projection vector:

determining a dot product between the layer input and the projection vector;

when the dot product is negative, assigning a first value to a corresponding position in the projection function output; and when the dot product is positive, assigning a second value to the corresponding position in the projection function output.

14. The computing system of claim 1, wherein, for each projection layer, the projection functions are each encoded as sparse matrices and are used to generate a binary representation from the layer input.

15. The computing system of claim 1, wherein the intermediate representation comprises a numerical feature vector.

16. A computer-implemented method to pre-train a projection neural network comprising one or more projection layers and one or more intermediate layers, each projection layer configured to apply one or more projection functions to project a layer input into a different dimensional space, the projection neural network configured to receive an input and to generate an intermediate representation for the input, the method comprising:

accessing, by one or more computing devices, a set of training data comprising a plurality of example inputs;

inputting, by the one or more computing devices, each of the plurality of example inputs into the projection neural network;

receiving, by the one or more computing devices, a respective intermediate representation for each of the plurality of example inputs as an output of the projection neural network;

inputting, by the one or more computing devices, each respective intermediate representation into a decoder model configured to reconstruct inputs based on intermediate representations;

receiving, by the one or more computing devices, a respective reconstructed input for each of the plurality of example inputs as an output of the decoder model; and learning, by the one or more computing devices, one or more parameter values for the one or more intermediate layers of the projection neural network based at least in part on a comparison of each respective reconstructed input to the corresponding example input.

17. The computer-implemented method of claim 16, wherein learning, by the one or more computing devices, the one or more parameter values for the one or more intermediate layers of the projection neural network based at least in part on the comparison of each respective reconstructed input to the corresponding example input comprises jointly training, by the one or more computing devices, the projection neural network and the decoder to maximize a probability of each respective reconstructed input matching the corresponding example input on a token-by-token basis.

18. The computer-implemented method of claim 16, further comprising, after learning the one or more parameter values:

providing, by the one or more computing devices, the projection neural network for use as a transferable natural language representation generator.

19. A computer-implemented method to pre-train a projection neural network comprising one or more projection layers and one or more intermediate layers, each projection layer configured to apply one or more projection functions to project a layer input into a different dimensional space, the projection neural network configured to receive an input and to generate an intermediate representation for the input, the method comprising:

accessing, by one or more computing devices, a set of training data comprising a plurality of input words, wherein a respective set of ground truth context words are associated with each of the plurality of input words;

inputting, by the one or more computing devices, each of the plurality of input words into the projection neural network;

receiving, by the one or more computing devices, a respective intermediate representation for each of the plurality of input words as an output of the projection neural network;

determining, by the one or more computing devices, a set of predicted context words for each of the plurality of input words based at least in part on the respective intermediate representation for each of the plurality of input words; and learning, by the one or more computing devices, one or more parameter values for the one or more intermediate layers of the projection neural network based at least in part on a comparison, for each input word, of the respective set of predicted context words to the respective set of ground truth context words.

20. The computer-implemented method of claim 19, wherein learning, by the one or more computing devices, the one or more parameter values comprises optimizing, by the one or more computing devices, a negative sampling objective function.

* * * * *